United States Patent [19]

Berger et al.

[11] Patent Number: 5,355,908

[45] Date of Patent: * Oct. 18, 1994

[54] REUSABLE PIPE UNION ASSEMBLY WITH AUTOMATIC FLUID FLOW CHECKING

[75] Inventors: Martin H. Berger, Edmonton; Leo L. Krywitsky, Toronto; Lee A. Krywitsky, Calgary, all of Canada

[73] Assignee: Hiltap Fittings, Ltd., Calgary, Canada

[*] Notice: The portion of the term of this patent subsequent to Oct. 18, 2008 has been disclaimed.

[21] Appl. No.: 399,786

[22] Filed: Aug. 28, 1989

Related U.S. Application Data

[63] Continuation-in-part of Ser. No. 335,149, Apr. 7, 1989, abandoned, which is a continuation of Ser. No. 1,331, Jan. 8, 1987, abandoned, which is a continuation-in-part of Ser. No. 839,332, Mar. 13, 1986, abandoned, which is a continuation-in-part of Ser. No. 819,948, Jan. 15, 1986, abandoned.

[51] Int. Cl.$^5$ .............................................. F16L 29/00
[52] U.S. Cl. ............................ 137/614.04; 251/149.6; 285/917
[58] Field of Search .................. 251/149, 149.1, 149.4, 251/149.6; 137/614, 614.04; 285/917

[56] References Cited

U.S. PATENT DOCUMENTS

| | | | |
|---|---|---|---|
| 1,345,571 | 7/1920 | Yates | 137/614.04 |
| 2,050,137 | 8/1936 | Walsh | 285/917 X |
| 2,730,380 | 1/1956 | Espy et al. | 137/614.04 |

FOREIGN PATENT DOCUMENTS 1026791 2/1978 Canada.

OTHER PUBLICATIONS

"Snap-tite" catalog, 4 pp. Union City, Pa. Jul. 1968.

*Primary Examiner*—John C. Fox
*Attorney, Agent, or Firm*—Workman Nydegger Jensen

[57] ABSTRACT

A pipe union assembly with embodiments which are capable of use over a very wide temperature range and which may be cycled through temperatures varying widely from the ambient assembly temperature and also over a wide range of pressures without the need to be retightened. Embodiments of the invention also include structures to automatically check the flow of fluids from the components of the pipe union upon disassembly of the union. The pipe union generally comprises one or more fitting members and a sealing member. The sealing member receives a ridge formed on each fitting member in a sealing fashion. One or more external sleeves hold the fitting member and the sealing member in sealing engagement. The materials from which each fitting member and sealing member are fabricated may be chosen so as to exhibit the proper hardness characteristics and thermal expansion coefficients. A compensating washer is also provided to increase compensation for thermal contractions at low temperatures. Embodiments are provided with restraining clips which are placed in grooves provided on the exterior of the fitting members so as to allow breaking of the sealing engagement and dissipation of any residual pressure before the union is completely disassembled.

44 Claims, 7 Drawing Sheets

REUSABLE PIPE UNION ASSEMBLY WITH AUTOMATIC FLUID FLOW CHECKING

BACKGROUND

1. Related Applications

This application is a continuation-in-part of copending United States patent application Ser. No. 355,149, filed on Apr. 7, 1989, now abandoned, which is a continuation application of United States patent application Ser. No. 1,331, filed on Jan. 8, 1987, now abandoned, which is a continuation-in-part of United States patent application Ser. No. 839,332, filed on Mar. 13, 1986, now abandoned, which is a continuation-in-part of United States patent application Ser. No. 819,948, filed on Jan. 15, 1986, now abandoned. All of the above referenced United States patent applications are hereby explicitly incorporated herein by reference.

2. The Field of the Invention

The present invention relates generally to fittings and couplers for use with pipes and hoses. More particularly, the present invention relates to reusable pipe union assemblies which allow two pipes to be repeatedly joined together and released from a sealing engagement and which automatically checks the flow of fluid when the two pipes are released from the sealing engagement even under high temperature conditions.

3. The Background Art

In many areas of modern industry, there is an urgent need for devices which allow two pipes are to be repeatedly joined together while allowing for easy separation of the pipes. This need is especially urgent where the pipes subjected to extreme pressure and/or temperature conditions, including severe changes in temperature, i.e., thermal cycling. The chemical, cryogenic, petroleum, and composite materials fabrication fields are just some examples of industries having such needs.

Although many different devices have been developed in the prior art for joining pipes, such devices often require cumbersome tightening by unwieldy tools if very high pressures and/or high or low temperatures are involved. The various devices found in the prior art may be called connectors, fittings, unions, couplings, joints, or some other name, but they all serve the same function of joining two pipes. Furthermore, not only are many of these prior art devices unsuitable in some applications, most also pose a safety threat to the operating mechanic assigned to loosen the connective fitting when high pressure is involved.

One of the most common methods of joining two pipes involves a flange joint. Use of the common "flange method" of joining two pipes has several disadvantages. First, it is generally cumbersome and quite difficult to join two pipes in this way, since many bolts and nuts are often required. It is important that all of the bolts be tightened equally. It will be appreciated that properly threading and tightening all the bolts and nuts on a flange joint can be a cumbersome task. The amount of time required to assemble or disassemble a flange joint can be a serious disadvantage in many applications.

Other disadvantages of the flange joint include the difficulty of disassembly because of the possibility of corrosion and aging of the flanges and ring gasket as well as the number of bolts and nuts which must be dealt with. Also, flange joints are subject to leakage when extremely cold, or extremely hot, fluid is introduced into the joint causing thermal contraction or expansion. Furthermore, repeated thermal expansion will often cause the joint to loosen and leak.

Also, in addition to the difficulty accompanying disassembly of the common flange joint, the person disassembling the flange joint is exposed to potential harm if any residual pressure remains within the system to which the pipes were connected. As a result, personal injury may occur during disassembly of a common flange joint because the flange joint does not provide any way of releasing residual pressure before being disassembled. If a method for releasing residual pressure is not provided, the person disassembling the joint faces the hazardous possibility that the joint will rapidly separate and spray its contents on the person during the disassembly procedure.

In an effort to overcome some of the above-mentioned difficulties, various devices have been suggested for use as easily assembled and/or reusable, pipe connectors. Among such pipe connectors which have been developed is one known as a GRAYLOC ® connector. While the GRAYLOC ® connector is an improvement over the common flange joint, it is still relatively difficult to assemble and disassemble, since several bolts and nuts are still required by the clamp structure of the connector. Moreover, there is no assurance that a joint assembled at room temperature will remain secure when exposed to thermal cycling at high and low temperatures. Further, the seal ring may need to be replaced even after a single assembly procedure because of permanent deformation damage. The GRAYLOC ® connector also provides little more protection to the person disassembling the joint from hazardous residual pressure than does the common flange joint.

Another common method of joining two pipes is known as the hammer union. In a hammer union, a first portion of the connector is provided with male pipe threads on its outer surface with its inner diameter being provided with a smooth sloping tapered surface oriented at an angle. A second portion of the connector is provided with a sloping tapered surface to complement that of the sloping tapered surface on the first portion.

The two tapered surfaces are mated together and an external rotating sleeve, with female threads, is slipped over the second portion of the pipe and threaded onto the male threads provided on the first portion of the connector. The external rotating sleeve, which is provided with ridges extending perpendicularly from its external circumference, is struck with a hammer in order to tighten the joint as much as possible. Thus, the name "hammer union."

The hammer union presents many of the same difficulties that are inherent in the "flange method" of joining two pipes, e.g., difficult disassembly, frequent inability to reuse the connector, and no protection from residual pressure remaining in the connector during disassembly.

One example of an attempt to provide a more easily assembled and disassembled pipe connector is known as a HANSEN ® coupling. While the HANSEN ® coupling has some advantages over other unions, the sealing function is provided by a flexible, rubber-like O-ring gasket which is unsuitable for use under extreme temperature or pressure conditions.

Another pipe connector which is an attempt to provide a more easily assembled and disassembled pipe union is known as a KAMLOK ™ connector. The sealing function of the KAMLOK ™ connector is provided by a gasket of rubber-like material. Thus, as with the HANSEN® coupling, the use of a flexible gasket seal makes this connector unsuitable for use in high temperature or high pressure applications.

An improvement over the above mentioned devices is found in Canadian Patent No. 1,026,791, issued to Krywitsky. The pipe fittings disclosed in the Krywitsky patent are an improvement over the HANSEN® coupling and the KAMLOK ™ connector in that the sealing function is provided by a metal-to-metal interface which allows higher temperatures and pressures to be contained within the fitting than is possible when flexible, rubber-like gaskets are used.

The fitting disclosed in the Krywitsky patent uses tubular members which are provided with annular recesses which are defined by relatively thin and flexible lips which serve to carry out the sealing function. Protrusions are forced into the recesses which flex according to the degree of penetration of the protrusions. Furthermore, as the internal pressure of the fitting increases or decreases, the lips flex somewhat helping to maintain the sealing contact against the protrusion.

Use of the arrangement disclosed in the Krywitsky patent allows the pipe fitting to be used in applications involving either a constant high or low temperature, since the seal is formed by metal-to-metal contact. However, several difficulties are inherent in the design disclosed in the Krywitsky patent.

First, because the lips of the metallic sealing ring are relatively flexible, the maximum pressure which may be reliably contained under some circumstances is limited to about 40 pounds per square inch ("psi").

Second, the fitting of the Krywitsky patent may become difficult to disassemble if the fitting lips "seize" onto the protrusion where the protrusion has been allowed to penetrate into the recess too far. Such excessive penetration may be necessary to stop leaking at pressures near the maximum allowed for the device.

Third, the sealing structures of the device of the Krywitsky patent may fail or be subject to damage due to fatigue caused by the flexing of the annular lips.

Fourth, as the annular lips flex, the contact area between the protrusion and the lips generally decreases. As the protrusion is forced deeper between the annular lips, the contact area diminishes to a very thin line around the protrusion. Once the contact area has been reduced to such a "point contact," failure of the device may easily occur.

Fifth, as the sealing ring wears because of normal use, the protrusions may be allowed to completely penetrate to the bottom of the recesses while still not providing a sufficient seal to stop leaking.

Sixth, because the sealing components may be easily damaged and subject to rapid wear, the reusability of the pipe fitting is uncertain from one use to the next.

Seventh, it is nearly always necessary to use tools to assemble or disassemble the fitting because of the pressure required to force the protrusion between the annular lips. The fact that tools must always be used decreases the usefulness of the connector. In many applications involving only moderate pressure, it would be very desirable to provide a connector which requires only hand tightening.

Thus, the pipe connector disclosed in the Krywitsky patent is useful over only a limited range of pressures, and questions of reliability arise after the fitting has been properly used only a few times, or improperly used (e.g., over-tightened), even once.

Still another need which has been unmet in the art is to provide a pipe connector which automatically halts or checks the flow of fluid through the connector when it is disassembled. The automatic checking of fluid flow not only serves an important safety function by preventing the leaking of potentially dangerous fluids from the pipes but also facilitates efficiently carrying out many processes in various industries. The composite materials fabrication industry is one such industry which would benefit from having a connector which automatically checks the flow of fluid when disassembled.

None of the above-mentioned devices provides a pipe connector which may be easily assembled and disassembled and which also maintains a leak proof seal while the device is cycled through a wide range of temperatures and pressures. Further, none of the devices discussed above provide a pipe connector which provides adequate protection from injury to the operator due to rapid release of residual pressure contained in the connector. Still further, none of the devices meet the needs of the rapidly expanding composite materials fabrication industry.

In view of the foregoing, it would be an advancement in the art to provide a pipe union assembly which may be repeatedly used at very low temperatures and also at very high temperatures. It would also be an advancement to provide a pipe union assembly which maintains a fluid tight seal even when subjected to wide thermal cycles i.e., subjected to temperatures that greatly vary from the ambient temperature at the time of assembly.

It would be another welcome advancement in the art to provide a pipe union assembly which may be easily assembled without requiring cumbersome tools and which may be hand tightened and still be cycled through temperature and pressure changes without requiring subsequent adjustment.

It would also be an advancement in the art to provide a pipe union assembly which may be subjected to extreme internal pressures and still maintain a fluid-tight seal. Still another advancement would be to provide a pipe union incorporating a structure to allow release of residual pressure from the union without causing harm to the person disassembling the union.

It would be another advancement in the art to provide a pipe union assembly which could be reused many times without repair or modification subsequent to each use. It would be a still further advancement in the art to provide a pipe union assembly which automatically halts the flow of fluid from the pipe whenever the pipe union is disassembled.

BRIEF SUMMARY AND OBJECTS OF THE INVENTION

The pipe union assemblies of the present invention generally comprise at least one hollow fitting member which may be attached to a pipe, and a sealing member which may (in at least one embodiment) be attached to another pipe. Each fitting member is provided with a tapered ridge running perimetrically or peripherally around the end of the fitting member so as to extend axially therefrom. The sealing member is provided with at least one perimetric or peripheral tapered channel configured in a shape which complements the shape of the tapered ridge. To provide a sealing engagement between the fitting member and the sealing member, the fitting member tapered ridge is inserted into sealing member tapered channel.

The planar contact between the sides of the tapered ridge and the walls of the rigid sealing member channel from a fluid tight seal. The taper, or angle, of both the fitting member ridge sides and the complimentary sealing member channel walls are chosen so as to form the most secure seal possible. The components of the pipe union assemblies of the present invention are self aligning which makes assembly quick and easy.

At least one external sleeve threadably engages another connector structure to hold the tapered ridge into sealing contact with the tapered channel of the rigid sealing member. The walls defining the channel of the rigid sealing member and the sides of the tapered ridge of the fitting member may be fabricated from materials which differ in their hardness by the appropriate amount to provide the maximum seal therebetween, as will be explained in more detail hereinafter.

In this regard, in one preferred embodiment of the present invention, materials are chosen which have thermal expansion coefficients which will cause the sealing engagement between the sides of the tapered ridge and the walls of the rigid sealing member to be maintained, or increased, as the temperature of the materials changes from the ambient assembly temperature. In another preferred embodiment, a compensating washer is provided to compensate for the decrease in sealing engagement which might otherwise be experienced when the assembly is subjected to temperatures much lower than the ambient assembly temperature.

By proper selection of the thermal expansion coefficients of the materials and inclusion of the compensating washer, a pipe union assembly is provided which is capable of maintaining a secure seal when subjected to thermal cycling, i.e., subjected to temperatures that vary greatly from the ambient assembly temperature. This advantage is in addition to the pipe union being well suited for use at either a constant high or low temperature.

In yet another preferred embodiment, a restricting means is provided to ensure that the union may be disassembled safely even though residual pressure remains in the connector. In still another described embodiment, structures are provided to check or halt the flow of fluid through the pipe union upon disassembly of the pipe union.

It is, therefore, an object of the present invention to provide a pipe union assembly which may be used at both very low temperatures and at very high temperatures.

Another object of the present invention is to provide a pipe union assembly which maintains a fluid tight seal when subjected to thermal cycling, i.e., subjected to temperatures well above and/or well below the ambient assembly temperature.

Yet another object of the present invention is to provide a pipe union assembly which maintains a fluid-tight seal when subjected to internal pressures ranging from at least well below atmospheric pressure to very high pressures.

Another object of the present invention is to provide a pipe union assembly which may be easily and rapidly assembled or disassembled without the use of cumbersome tools and which has a self aligning sealing member.

A further object of the present invention is to provide a pipe union assembly which may be hand tightened for normal operation and which maintains a fluid-tight seal without subsequent adjustment after assembly even though subjected to widely varying extremes of both temperature and pressure.

Still another object of the present invention is to provide a pipe union assembly which provides a means for releasing residual pressure remaining in the union while protecting the person disassembling the union from harm.

A further object of the present invention is to provide a pipe union assembly which may be reused many times without repair or modification subsequent to each use.

Yet another object of the present invention is to provide a pipe union assembly which automatically halts or checks the flow of fluid therefrom upon disassembly of the union.

These and other objects and features of the present invention will become more fully apparent from the following description and appended claims taken in conjunction with the accompanying drawings.

DETAILED DESCRIPTION OF THE PREFERRED EMBODIMENTS

Reference will now be made to the drawings wherein like parts are designated with like numerals throughout.

A. A First Presently Preferred Embodiment

Figure 1:
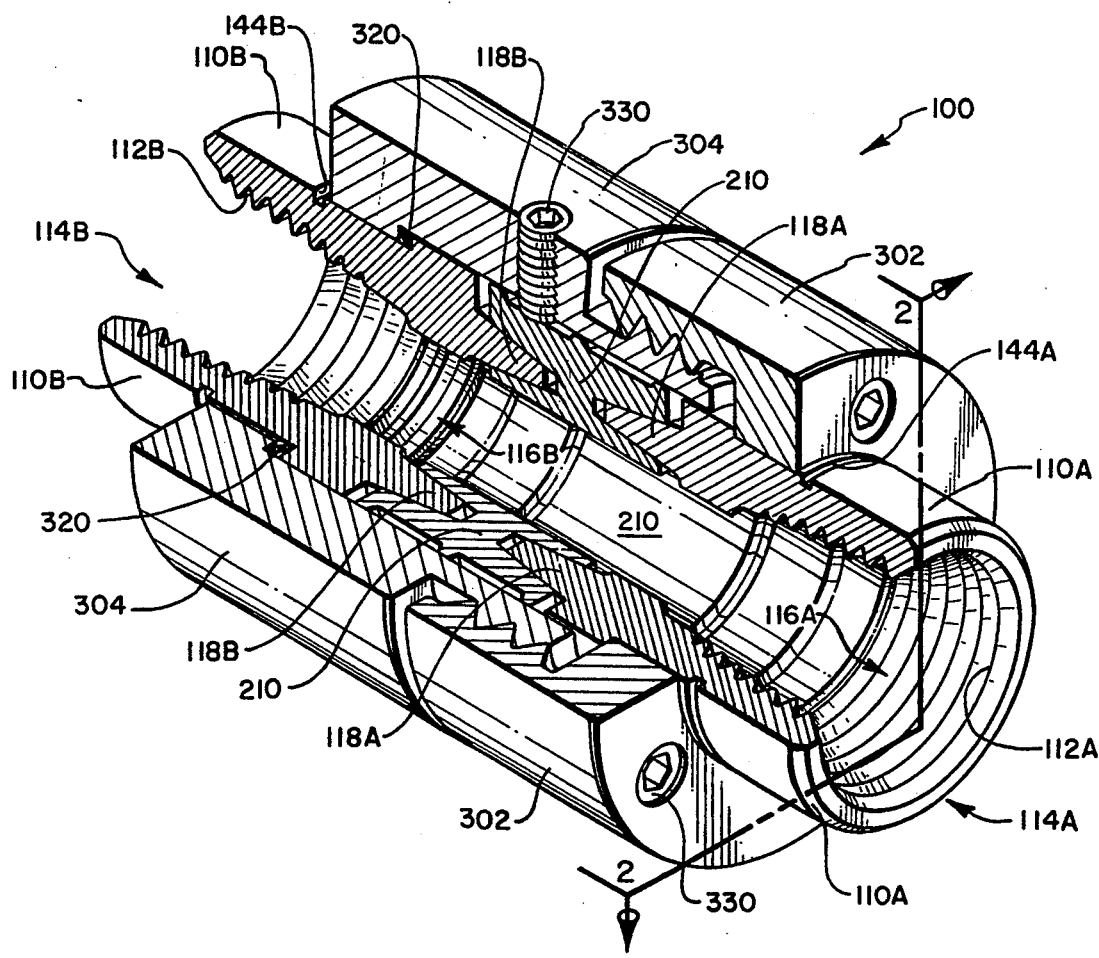
FIG. 1 is a partially cutaway perspective view of a first presently preferred embodiment of the present invention.

Referring first to FIG. 1, a partially cutaway view of one presently preferred embodiment of the present invention is shown. This embodiment, generally designated 100 in FIG. 1, includes two hollow fitting members 110A and 110B, a hollow sealing member or sealing ferrule 210, two external sleeves 302 and 304 which are shown threaded together, a compensating washer 320 (shown in more detail in FIG. 5), and restraining clips 326, also sometimes referred to as safety clips 326 (shown in FIGS. 6 and 7). Restraining clips 326 are received by restraining clip grooves 144A and 144B, shown best in FIGS. 1 and 2.

In order to simplify the description of this embodiment, the structures associated with fitting members 110A and 110B have been assigned reference numerals from 110 to 144 and also an appropriate A or B letter which corresponds to fitting member 110A and fitting member 110B, respectively. Those structures associated with sealing member 210 have been assigned reference numerals from 210 to 230, and in some cases are also designated by an appropriate A or B letter if the structure is particularly associated with fitting member 110A or 110B.

As seen in FIG. 1, fitting members 110A and 110B are cylindrically shaped with threads 112A or 112B formed around the inside of their outermost ends; these outermost ends are generally designated 114A or 114B in FIG. 1. The diameter of fitting members 110A and 110B may be identical where pipes of identical diameter are to be joined, or may be dissimilar in order to facilitate interfacing with pipes of different sizes or shapes as will be explained hereinafter.

It should be understood that, as used throughout this disclosure and the appended claims, the terms "pipe" and "pipe member" are meant to include hoses, tubing, and any other conduit-like structure, whether rigid or flexible, used to carry a fluid. Furthermore, the term "fluid" is intended to refer to liquids, gases, or a mixture of both.

Since in the embodiment illustrated in FIGS. 1-7 fitting members 110A and 110B are identical, the following description will only make reference to fitting member 110A and its associated structures with the understanding that the same disclosure also relates to fitting member 110B and its associated structures.

The interior cavity, generally indicated at 116A in FIG. 1, of fitting member 110A is shown as being cylindrical; however, interior cavity 116A and fitting member 110A may also take on other configurations. For example, elliptical or rectangular shaped cavities 116A may be used according to the needs of the particular application.

While the embodiment shown in FIGS. 1-7 is intended to be attached to a pipe by threading female threaded portion 112A onto a male threaded portion of the pipe (not shown), other methods for joining each fitting member to a pipe member may be used. Besides the pipe threads as shown in FIGS. 1-2 and 6-7, other possible methods include high pressure acme threads, butt welding, or other methods well known in the art.

Whatever method is used to attach a pipe member to fitting member 110A, the seal formed by the connection must have sufficient strength to ensure that the connection will not leak or deteriorate when used at the expected operating temperatures and pressures. In addition, the seal must also be resistant to the fluid (which in some cases may be corrosive) passed through the pipe union assembly.

The pipe member may be rigidly or even permanently joined to fitting member 110A, since the need to disassemble the pipe member from fitting member 110A is typically unnecessary when using the present invention. Thus, the connection between the pipe member and fitting member 110A may be made by welding to provide additional strength and prevent any further leakage.

Figure 2:
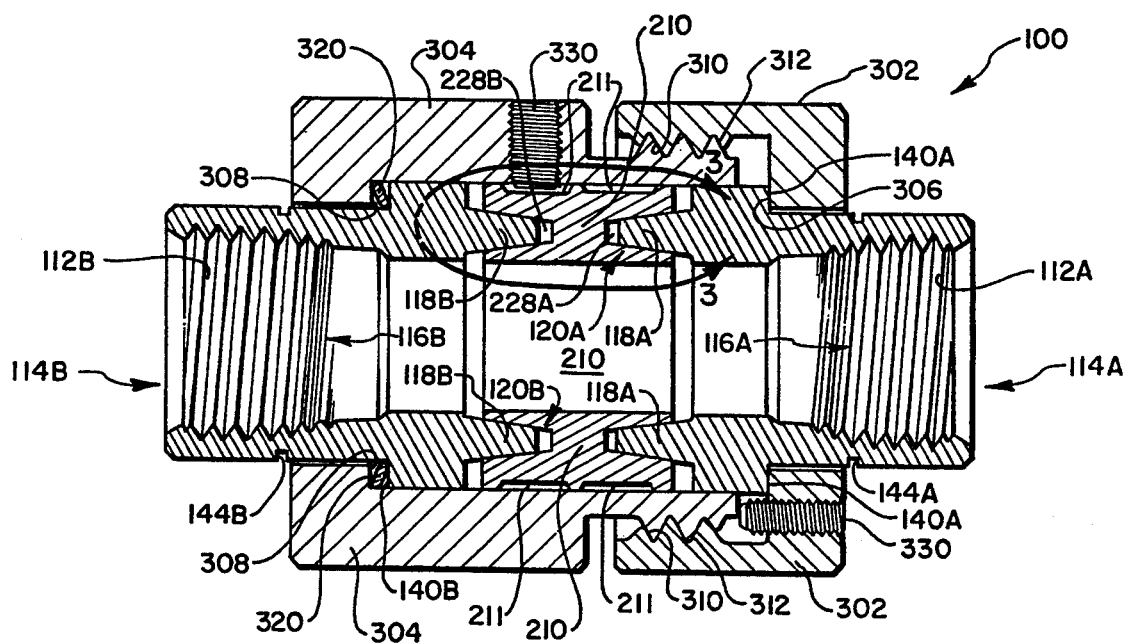
FIG. 2 is an elevated cross-sectional view of the embodiment of FIG. 1 taken along line 2—2 of FIG. 1.

Furthermore, the present invention makes interfacing of pipes, tubing, and hoses of different size, shape, and material much simpler than prior art methods. Since fitting member 110A may be easily adapted to accept these different pipes, tubing, or hoses at its outermost end 114A, as indicated in FIGS. 1 and 2, the remainder of its structure may be fabricated to a standard size. Thus, the present invention greatly facilitates the joining of dissimilar pipes without affecting the compatibility of the interface between fitting member 110A and sealing member 210.

The material used to fabricate fitting member 110A must be carefully chosen in accordance with four criteria. These criteria for selection of the material are: (1) the material must exhibit sufficient strength so as to not be adversely affected when subjected to the temperatures and pressures of the expected operating conditions; (2) the material must be resistant to any corrosive action of the fluid introduced therethrough; (3) the material must have an appropriate thermal expansion coefficient, as discussed below, and (4) the material must have an appropriate hardness, as discussed below.

Fitting member 110A, as shown in FIGS. 1 and 2, may be fabricated from various metals, e.g., carbon steel or stainless steel, which exhibit characteristics suitable for the desired application. In this disclosure, the hardness of various materials will generally be referenced to the industry standard Brinell hardness scale (generally referenced as "HB =").

As will be appreciated by those skilled in the art of metallurgy, the Brinell hardness number is obtained by indenting the surface of the metal with a hardened steel ball under a load and measuring the average diameter of the impression by visual observation through a microscope. The measurements provided herein were obtained using Brinell type hardness tester and applying a 3000 Kg load. Using the Brinell hardness number, it is possible to determine the equivalent hardness number on other common hardness scales including the Rockwell, Vickers, and Shore scales by methods well-known in the art.

Figure 4:
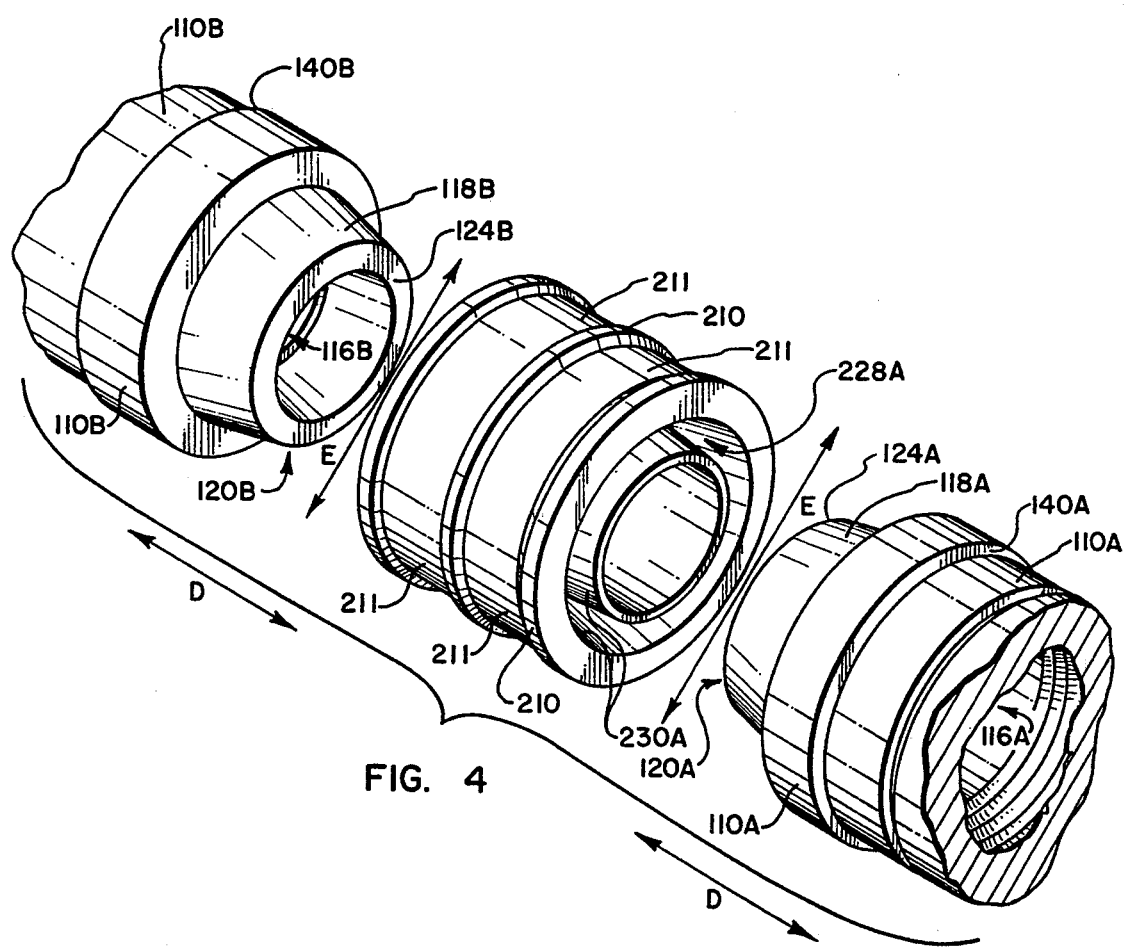
FIG. 4 is an exploded perspective view of the rigid sealing member and the two fitting members of the presently preferred embodiment of FIG. 1.

As can be seen best in FIG. 4, each of fitting members 110A and 110B has a corresponding peripheral tapered ridge 118A and 118B, respectively, at the corresponding innermost end 120A and 120B, respectively, of the corresponding fitting members. The terms "peripheral" and "perimetric" are adopted herewith to describe tapered ridge 118A and tapered channel 228A since ridge 118A and 118B are disposed around the perimeter of the interior cavity formed within fitting member 110A. Thus, peripheral tapered ridge 118A peripherally defines the opening of cavity 116A formed through fitting member 110A.

Sealing member 210, also referred to as ferrule 210, is provided with two peripheral or perimetric tapered channels, generally designated 228A (see FIGS. 2, 3, and 4) and 228B (see FIGS. 2 and 3), each configured to receive its corresponding peripheral tapered ridge 118A or 118B. Advantageously, sealing member 210 of the present invention is self aligning in that once tapered ridge 118A is inserted into tapered channel 228A, no further positioning of sealing member 210 is required by the person assembling the union.

Ferrule 210 is preferably shaped so as to match the shape of interior cavity 116A and the exterior shape of fitting member 110A. Thus, if fitting member 110A is cylindrical, as shown the figures, the shape of ferrule 210 is preferably also cylindrical.

Figure 3:
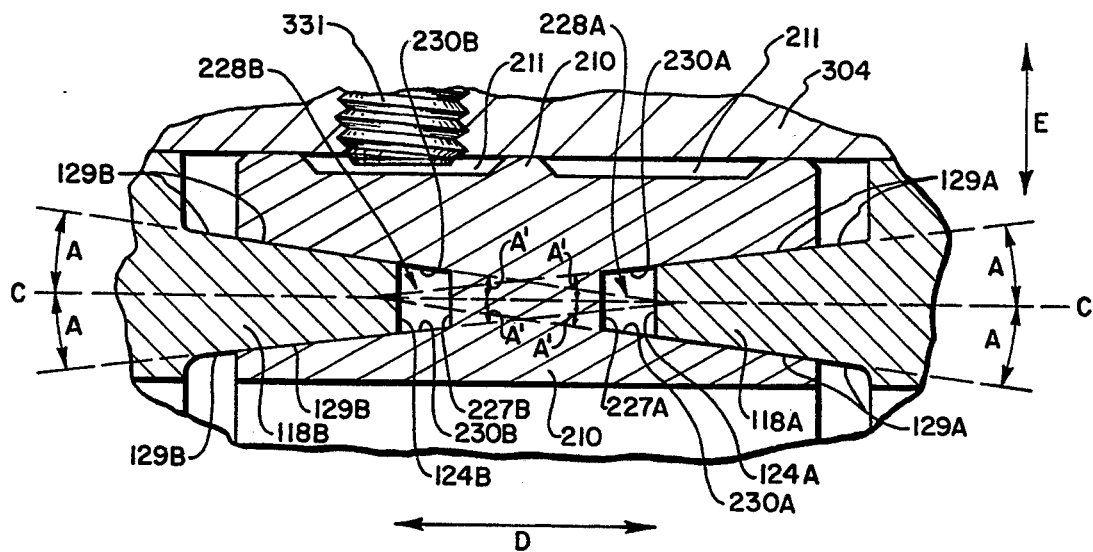
FIG. 3 is an enlarged view of the portion of FIG. 2 shown circled by the line 3—3 of FIG. 2.

FIG. 3 shows the detail of tapered ridge sides 129A which are preferably smooth, flat, machined surfaces and which are oriented at an angle A to the central axis of fitting member 110A. In FIG. 3, the broken line marked C represents the central axis of fitting members 110A and 110B and ferrule 210.

It is preferred that tapered ridge sides 129A, and tapered channel walls 230A, be precisely machined to a 32 finish or better. Those skilled in the art of machining metals will appreciate that the designation "32 finish" indicates that the arithmetic mean of the departures from an ideally flat surface is equal to only 32 microinches. Thus, while a very flat surface may be difficult to obtain, it is generally desirable that tapered ridge sides 129A be as flat as possible. However, as will be explained later in connection with the preferred range of hardness of the materials used in the embodiment, a surface finish less precise than a 32 finish may be used in some applications.

Angle A may be within the range from about 2° to about 12°. However, angle A is preferably in the range of from about 5° to about 9° and is most preferably in the range from about 6° to about 8° in the embodiment shown in FIG. 3. If angle A is too great, for example greater than 12°, it may be difficult to obtain the maximum possible sealing. Generally, as angle A increases, so must the pressure exerted on the fitting members to urge them toward the sealing member in order to maintain a secure seal.

If angel A is too shallow, for example less than 2°, damage to ridge sides 129A and channel walls 230A may occur making it difficult to disassemble and reuse the union. Such damage occurs because a bond similar to a "cold weld" may occur between tapered ridge sides 129A and tapered channel walls 230A which may result in galling.

It should be appreciated that using angles less than 5° will often result in a more secure seal, but such angles will also potentially result in an embodiment which may be reused fewer times and may also be difficult to disassemble. However, if the feature of providing a secure seal is paramount to providing a reusable pipe union, angles less than 5° may be used. Also, using an embodiment such as that illustrated in FIGS. 12 and 13 utilizing an easily replaceable sealing ring, allows the softer sealing ring to be discarded if it becomes damaged.

Conversely, the use of angles greater than 9° may potentially result in a less secure seal but may also result in an embodiment which may be used a greater number of times. In some applications one or the other consideration may be paramount. An angle in the range from 6° to about 8° has been found to be most preferable for most applications.

Also, for maximum sealing in the embodiments of the present invention, the mating surfaces, ridge sides 129A, and channel walls 230A in FIG. 3 should be formed to tolerances which are as close as possible. For example, a tolerance of ±1 minute (1/60 of a degree) is desirable. However, if possible, a tolerance within several seconds is more preferable. The distal end 124A of ridge 118A is preferably straight and flat as shown in FIG. 3.

Thus, when fabricating tapered ridge sides 129A and tapered channel 230A, it is necessary to consider the angle of the surfaces, the acceptable deviation, i.e., tolerance, from the chosen angle, and the surface roughness of the surfaces. It should be appreciated that if maximum sealing is to be obtained careful attention must be paid to these considerations. However, if the embodiment is to be used in less demanding applications, less attention needs to be paid to these considerations.

The peripheral tapered channels, generally designated 228A and 228B in FIGS. 2, 3, and 4, located on opposite faces of ferrule 210, are each provided with two flat walls 230A and 230B respectively, as shown best in FIG. 3. Channel bottoms 227A and 227B are preferably smooth and flat. In the following discussion, only the side of ferrule 210 associated with fitting member 110A will be described, with the understanding that the other side of ferrule 210 associated with the structure of fitting member 110B is symmetrically identical.

The angle at which channel walls 230A are oriented with respect to axis C is designated A' in FIG. 3. The angle A' must match the angle A of tapered ridge sides 129A within very close tolerances for proper sealing contact and engagement to occur. Thus, as explained earlier, both angles A and A' should be within the range of about 2° to about 12°, with the range from about 5° to about 9° being preferable and the range from about 6° to about 8° being most presently preferred.

As shown best in FIG. 3, tapered ridge 118A is configured so that the end thereof cannot come into contact with channel bottom 227A. Thus, the narrowest portion of tapered ridge 118A should not be as narrow as the narrowest portion of channel 228A.

Due to the foregoing structure, tapered ridge 118A cannot completely penetrate peripheral channel 228A. However, since the angle A' of channel walls 230A and the angle A of ridge sides 129A are essentially identical, a very precise mating occurs between channel walls 230A and tapered ridge sides 129A.

By providing ridge 118A and channel 228A with tapered surfaces, greater surface area is provided which allows an improved sealing engagement without increasing the diameter of the embodiment as is required, for example, to increase the sealing surface area when using a common flange joint.

Furthermore, use of a tapered ridge 118A and a tapered channel 228A advantageously allows greater pressure to be applied to the ridge/channel sealing surfaces. Use of the tapered structures allows relatively high pressures to be exerted on the sealing surfaces without resorting to tools when assembling the pipe union of the present invention. Since sufficient sealing for some applications occurs by tightening the embodiments by hand, tools are often not needed during assembly or disassembly. However, it may be desirable with some embodiments to use a wrench while assembling the union, or to include handles on the external sleeves of the embodiment.

In contrast to the "reusable" pipe fittings found in the background art, the present invention achieves a seal by making use of planar sealing surfaces, comprised of tapered ridge sides 129A and tapered channel walls 230A. The fittings found in the background art typically rely on a point or linear contact to effect a seal. By making use of planar sealing surfaces, the present invention is much less affected by imperfections in the sealing surfaces as well as having the other advantages mentioned herein.

Importantly, sealing ferrule 210 should be fabricated of a material which has characteristics which will allow it to remain rigid even under the pressure exerted by the insertion of tapered ridge 118A into tapered channel 228A. It should be appreciated that the term "rigid" as used herein is intended to mean that no substantial macroscopic changes occur.

Furthermore, it is preferable that no macroscopic change occur in either fitting member 110A or sealing member 210 after proper assembly of the coupling. However, it is desirable in some cases that a microscopic change occur at the mating surfaces of ridge sides 192A and channel walls 130A as will be explained hereinafter.

As stated earlier, there are also other considerations which should be given careful attention when choosing a material from which to fabricate ferrule 210 and fitting members 110A and 110B. Primarily, these considerations are the thermal expansion characteristics of the material and the hardness of the material. In one preferred embodiment, ferrule 210 is fabricated from aluminum type 7075 and fitting members 110A and 110B are made from stainless steel type 304.

Aluminum 7075 possesses a surface hardness 115 Brinell units softer than stainless steel 304. Also, the coefficient of thermal expansion of aluminum 7075 is $7.4 \times 10^{-6}$ meters/meter $\cdot °$ C. greater than the coefficient of thermal expansion of stainless steel 304. The particular importance played by the coefficient of thermal expansion exhibited by the material is explained below.

It is often the case that the present invention will be assembled at an ambient temperature which may range from $-50°$ C. to $+50°$ C. in some industrial environments as well as in some harsh naturally occurring environments. While some background art devices mentioned earlier would have difficulty maintaining any adequate seal at a temperature of $-50°$ C., none of the known "reusable" devices is able to maintain a secure seal as the temperature of the fitting is significantly elevated above, or reduced below, the "ambient assembly temperature."

Still further, the challenge of maintaining a secure seal is increased when the fitting is subjected to repeated thermal cycling. For example, the pipe union assembly of the present invention may be used at an oil extraction facility near the Arctic Circle. In the winter, such assemblies may be assembled at temperatures as low as $-50°$ C. and then experience a temperature rise of more than $400°$ C., and pressures above 2,000 psi, when steam is passed through the assembly. Alternatively, in other applications the ambient assembly temperature may be $25°$ C. but then drop into the cryogenic regions as liquid nitrogen at lower than $-190°$ C. is introduced into the assembly.

As the temperature of the pipe union assembly of the present invention varies due to either changing ambient conditions or the temperature of the fluid introduced into the pipe union assembly, the components of the union will undergo thermal expansion or contraction. The case of thermal expansion or thermal contraction, whichever is to be expected, must be considered when designing a pipe union assembly which will be used over greatly varying temperature conditions.

As can be appreciated by examining the structure shown in FIG. 3, rather than incorporating a single sealing surface, two sealing surfaces are provided on each tapered ridge 118A and tapered channel 228A. Each tapered ridge 118A is provided with two identical sides 129A and each tapered channel 228A is provided with two identical walls 230A.

Since one of each of these sides makes sealing contact with a corresponding wall, two sealing surfaces are created by each tapered ridge 118A and tapered channel 228A pair. In addition to such attributes as the earlier mentioned planar sealing surfaces, the redundancy of sealing surfaces is an additional characteristic which allows the present invention to provide a seal which is more secure than that provided by previously available devices.

The two sealing surfaces will be referred to as the inner sealing surface, comprising ridge side 129A and channel wall 230A which are nearest the inner cavity of the embodiment, and the outer sealing surface, comprising ridge side 129A and channel wall 230A which are nearest the exterior of the embodiment. Ideally, the inner sealing surface will maintain a seal to keep the fluid within the assembly. If the inner sealing surface fails to do so, the outer sealing surface will retain any fluid escaping into channel 228A. Also, the inner diameter of external sleeve 304 fits very closely to the outer diameter of sealing member 210 as shown in FIG. 3. Thus, external sleeve 304 assists in keeping the sealing surfaces in engagement with each other under high pressure conditions.

It is desirable, however, that the inner sealing surface be securely maintained because once fluid escapes into channel 228A, the additional pressure in channel 228A will tend to push ridge 118A out of channel 228A which may increase the possibility of the outer sealing surface also failing. Because of the above-explained considerations, if a seal is to be maintained at maximum pressure and at a maximum temperature difference, the below described attributes must be incorporated into the embodiment.

As the temperature of the assembly increases there is generally an accompanying increase in the pressure internal to the union. Thus, as temperature and/or pressure increases it is important that the seal provided by the mating of channel walls 230A and ridge sides 129A be maintained or improved. This consideration is met by carefully selecting the material from which ferrule 210 and fitting member 110A are fabricated so as to meet the strength, rigidity, hardness and thermal expansion characteristics that are required by the particular application.

Importantly, when an embodiment of the present invention must maintain a high pressure seal over a wide range of temperatures the thermal expansion coefficient of the material from which fitting member 110A is fabricated shall be different than the thermal expansion coefficient of the material from which ferrule 210 is fabricated.

Referring now to FIG. 4, when the "operating temperature" will be significantly greater than the ambient assembly temperature, fitting member 110A should preferably exhibit a higher thermal expansion coefficient than ferrule 210. Then, as both are subjected to the same elevated temperature, fitting member 110A will expand to a greater extent than ferrule 210. Importantly, fitting member 110A will expand both axially, along line D of FIGS. 3 and 4, and radially, along line E of FIGS. 3 and 4. Also, the width of tapered ridge 118A will also expand to a greater extent than tapered channel 230A. Thus, as tapered ridge 118A expands in the direction indicated by lines D and E, the pressure exerted upon the interface at channel walls 230A and ridge sides 129A is increased resulting in an improved seal.

Figure 5:
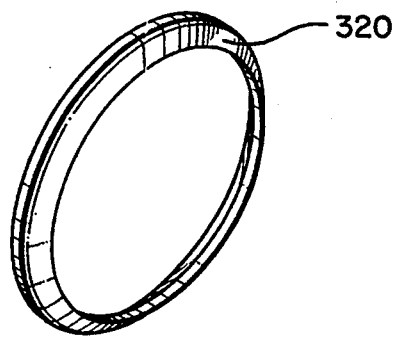
FIG. 5 is a perspective view of one presently preferred embodiment of the compensating washer of the present invention.

When the operating temperature of the assembly will be significantly less than the ambient assembly temperature, sealing member 210 should preferably exhibit a higher thermal expansion coefficient than fitting member 110A. Thus, rather than expanding as just explained, sealing member 210 will contract to a greater extent than fitting member 110A along lines D and E shown in FIG. 4. In order to provide the most secure seal when the operating temperature will be lower than the ambient assembly temperature, an additional structure, a compensating washer 320 illustrated in FIG. 5, is included. (The use and selection of the compensating washer will be explained in detail below).

Another primary consideration is the hardness of the material of both tapered ridge sides 129A and channel walls 230A. Table 1 provides a list of representative materials which may have application in the present invention. The values provided in Table 1 were taken from the *ASM Metals Reference Book* (2d ed. 1983).

It will be appreciated that the values given for both the hardness and the thermal coefficient of expansion are subject to measurement errors and will vary slightly with temperature. However, the values provided, which assume a temperature of about 25° C., are useful since the difference in values between two metals will remain qualitatively the same as the temperature varies.

230A and ridge sides 129A may be plated or coated with appropriate material such as zinc or copper as listed in Table 1.

Using the Brinell hardness scale, it has been found that the material used in ferrule channel walls 230A should have a difference in hardness in the range of about HB=1 to about HB=300 when compared to the material used for tapered ridge sides 129A. Desirable results are also obtained when the hardness differential between the two materials is limited to within the range of from about HB=5 to about HB=200. However, in many applications a range of from HB=10 to about HB=150 will be most preferred.

As will be appreciated by those skilled in the art, as the hardness of a metal increases, the difficulty of precisely machining the metal also increases. Still, in some high temperature and high pressure environments it may be desirable to use very hard metals with or without additional materials plated on the tapered ridge sides or the tapered channel walls. A general purpose pipe union assembly may have the entire fitting member 110A, including ridges 129A, fabricated of carbon steel type 1040, while ferrule 210 may have a body fabricated of carbon steel type 1020.

As stated earlier, ridge sides 129A and channel walls

TABLE 1

| METAL | BRINELL HARDNESS | | COEFFICIENT OF LINEAR THERMAL EXPANSION M · °C. |
|---|---|---|---|
| CARBON STEEL | | | |
| 1018 | 111 | | $11.8 \times 10^{-6}$ M |
| 1020 | 111 | | 11.7 |
| 1040 | 201 | | 12.0 |
| 1040 | 514 | (Heat Treated) | 12.0 |
| 4140 | 302 | | 12.7 |
| 5160 | 627 | | 12.6 |
| STAINLESS STEEL | | | |
| 303 | 175 | | 17.2 |
| 304 | 175 | | 17.2 |
| ALUMINUM | | | |
| 2011T3 | 95 | | 22.6 |
| 2024 | 120 | | 22.7 |
| 6061 | 65 | | 24.3 |
| 7075 | 60 | | 24.6 |
| ZINC (PLATED) | 76 | | 27.4 |
| COPPER (PLATED) | 44 | | 16.5 |

In order to provide the most secure seal possible at the channel/ridge interface, channel walls 230A and ridge sides 129A are fabricated of materials which differ in their hardness. In the embodiment shown in FIG. 3, channel walls 230A are fabricated from a material softer than tapered ridge sides 129A. Alternatively, tapered ridge sides 129A could be of a material softer than channel walls 230A.

Fabricating sealing member 210 from the softer material is presently preferred. While embodiments of the present invention may be used many times when properly assembled, should replacement of a part become necessary, it is desirable that the replaced part be ferrule 210. As explained earlier, fitting member 110A will often be permanently attached to a pipe member. Thus, fitting member 110A may be difficult to replace while ferrule 210 is easy to replace. By making ferrule 210 of a softer material, ferrule 210, rather than fitting member 110A, will be the component to incur damage due to improper use or wear.

It should be appreciated that the proper "hardness differential" may be accomplished either by fabricating the entire ferrule 210 or fitting member 110A of a material having the appropriate hardness, or channel walls 230A are preferably formed to a 32 finish or better. In addition to the previously discussed reasons, due to the fact that it is nearly impossible, and commercially impractical, to form ridge sides 129A and channel walls 230A to eliminate all surface roughness, it is necessary to use metals of differing hardness. Since even after precise machining minute imperfections remain in the surface of ridge sides 129A and channel walls 230A, the use of metals having differing hardnesses allows the softer metal surface to conform to the contour of the harder metal surface and improve the sealing contact.

It will be appreciated that the conforming of the softer surface occurs microscopically rather than macroscopically. Thus, no substantial change in dimensions takes place during the sealing process. The conforming of the softer surface allows the surfaces to function nearly as well as, or even better than, perfectly flat surfaces.

It will be realized that the conforming of the softer surface involves deformation of the softer surface. In those cases where the surface imperfections are not too great, the deformation will be elastic (i.e., nonpermanent) deformation. In the case of more severe imperfections, the deformation can be best described as plastic (i.e., permanent) deformation. When severe surface imperfections are present, plastic deformation tends to permanently reduce the size of the imperfections and thus improve the sealing function during subsequent uses. If the deformation falls within the elastic range of the softer material, the surface will repeatedly conform to the harder surface.

It is important that the difference in hardness of the materials not be too great. For example, channel wall 230A material must not be too much softer than the tapered ridge side 129A material. If the channel wall material is too soft, channel walls 230A may undergo too much plastic deformation resulting in damage during insertion of tapered ridge 118A and possibly making disassembly and reuse of the union difficult due to permanent macroscopic deformation of the channel wall 230A. Conversely, if channel wall 230A material is not soft enough, the maximum possible seal will not be formed.

It will be appreciated that in some applications considerations of providing a secure seal may outweigh considerations of reusability. In some circumstances, it may be deemed best to use materials which widely differ in their hardness even if it means that the device may only be reused a few times. Alternatively, if reusability is the paramount consideration, use of relatively hard materials for both fitting member 110A and ferrule 210 may be deemed best. However, as the hardness differential between the materials decreases, the pressure which the union can contain when hand-tightened will decrease. Conversely, as the hardness differential between the two materials increases, a secure seal may still be attainable by hand tightening.

By carefully implementing considerations of the angle of the sealing surfaces, the tolerance of the angle, the surface roughness of the sealing surfaces, the hardness exhibited by the sealing surfaces, and the coefficients of thermal expansion exhibited by the materials, a pipe union assembly which is reusable many times at extreme pressures and temperatures, and through repeated thermal cycles, is obtained. It should be appreciated that if less than maximum sealing in extreme conditions is all that is required, one or more of the considerations may be applied less rigorously.

Figure 6:
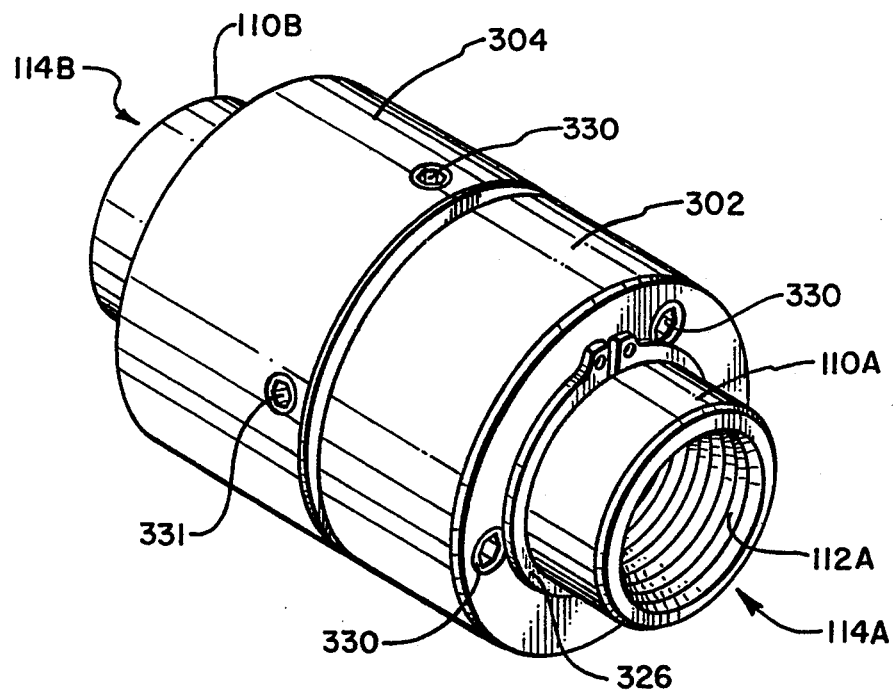
FIG. 6 is a perspective view of the embodiment of FIG. 1 completely assembled.
Figure 7:
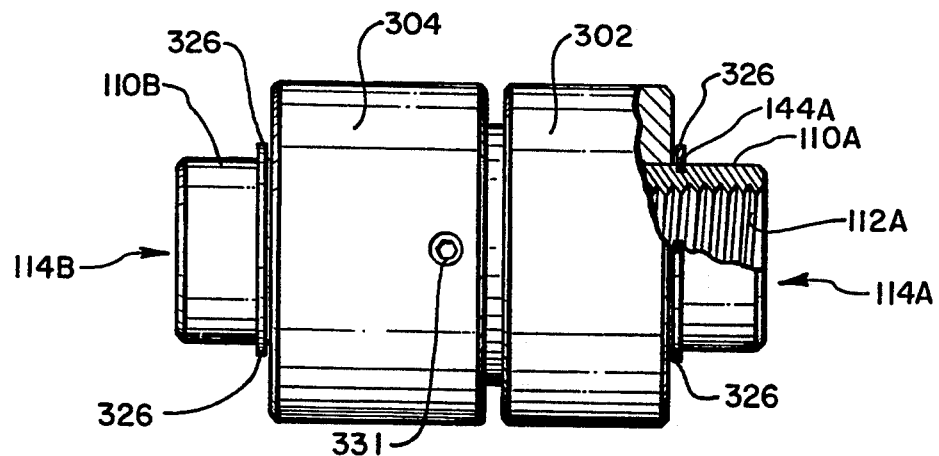
FIG. 7 is a partially cutaway elevated view of the embodiment of FIG. 6.

Male external sleeve 304 and female external sleeve 302, shown in FIGS. 1 and 2 and in FIGS. 6 and 7, are provided to align and urge fitting member ridge 118A into sealing engagement with sealing member channel 228A and to secure the resultant seal. In one general purpose embodiment, external sleeves 304 and 302 are fabricated from carbon steel type 1018. Carbon steel 1018 is a relatively low-cost, easily machined material having sufficient strength for a general purpose union.

As seen in FIGS. 2 and 4, each fitting member 110A and 110B has on its external surface an abutting edge, designated 140A and 140B, respectively. Referring to FIG. 2, the external sleeves 304 and 302 are each formed with corresponding compressing edges, 308 and 306, such that when both male external sleeve 304 and female external sleeve 302 are drawn together by joining the threads 312 and 310 of the male and female external sleeves 304 and 302, respectively, tapered ridge 118A is urged into sealing contact with tapered channel 228A.

As shown in FIG. 1, external sleeves 302 and 304 are generally cylindrical and have dimensions which allow their inner diameters to slip over the outer diameters of fitting members 110A or 110B and ferrule 210 with compressing edges 306 and 308 engaging abutting edges 140A and 140B, respectively. Preferably, the fit between the inner diameter of external sleeves, 302 and 304, and the outer diameters of fitting members 110A and 110B and ferrule 210, is a precise one, as shown in FIG. 2, so as to add additional strength to the union 100 by contacting the outer circumference of ferrule 210 and stabilizing its position.

It should be appreciated that structures other than the structures shown in the figures may be devised and used to urge sealing member 210 and fitting members 110A and 110B into sealing engagement.

Optionally, external sleeves 302 and 304 may also be provided with set screws as shown best in FIGS. 6 and 7 at 330 and 331. Set screw 331, inserted through the threaded bore provided at the circumference of male external sleeve 304 protrudes into ferrule recess 211 but does not make contact with ferrule 210. In this way, ferrule 210 is "loosely" held in contact with fitting member 110B so as to be held ready for insertion of ridge 118B. Also, since ferrule is held captive by set screw 331, it will not be misplaced. However, ferrule 210 should still be allowed to rotate freely so set screw 331 cannot be inserted too far. It should be appreciated that more than one set screw 331 may be included.

As shown best in FIG. 2, set screws 330 inserted through female external sleeve 302 preferably engage the end of male external sleeve 304 which is inserted into female external sleeve 302. Set screws 330, when tightened, prevent the union from being disassembled inadvertently and also prevent either of external sleeves 302 or 304 from loosening due to vibration.

As explained earlier, the thermal contraction of the components at cold temperatures must also be considered in order to provide a pipe union assembly which may be assembled at room temperature but yet still maintain a seal when the union is subjected to very low temperatures. Proper selection of a material for fabrication of ferrule 210 and fitting member 110A, e.g., choosing a material having a different (either higher or lower) thermal expansion coefficient for fabrication of fitting member 110A, assists in maintaining a seal when very cold temperatures are encountered.

Sometimes, however, reliance on thermal contraction of the members may not be completely effective to ensure that a proper seal will be maintained when very cold temperatures are encountered. This is because axial contraction of fitting member 110A, along line D of FIG. 4 may counteract any positive effect of radial contraction. The term often used to describe such axial contraction is "creeping."

In order to ensure that a proper seal is maintained when temperatures fall well below the ambient temperature at the time of assembly, a structure is provided to resiliently urge peripheral tapered ridge 118A into sealing member channel 228A. This function is accomplished by a creep-compensating washer 320 shown in the view of FIG. 2 as well as in the perspective view of FIG. 5.

Washer 320, which is preferably a spring washer, is placed between abutting edge 140B of fitting member 110B and compressing edge 308 of male external sleeve 304 as seen best in FIG. 2. Alternatively, compensating washer 320 may be placed between abutting edge 140A of fitting member 110A and compressing edge 306 of female external sleeve 302. Still further, two or more compensating washers 320 can be simultaneously used for additional compensation if desired.

As can be seen in FIG. 5, washer 320 is formed in a conical section which allows washer 320 to act as a spring. The spring-like structure of washer 320 can be seen best in the cross-sectional view of FIG. 2. Thus, as tapered ridges 118A and 118B tend to recede from sealing member channels 228A and 228B due to axial thermal contraction (i.e., "creeping"), compensating washer 320 compensates for this creep by urging tapered ridges 118A and 118B into sealing contact with channel walls 230A and 230B.

As shown in FIGS. 1 and 2, each of fitting members 110A and 110B are also provided with grooves 144A and 144B, into which restraining clips 326, shown in FIGS. 6 and 7, are placed. Grooves 144A and 144B and restraining clips 326, also referred to as safety clips 326, serve the important function of assisting and protecting the operator during the disassembly of the pipe union 100. By placing removable restraining clips 326 in grooves 144A and 144B near the external sleeves 302 and 304, restraining clips 326 restrain the unthreading of external sleeves 302 and 304.

For example, to disassemble the embodiment shown in FIG. 7, the external sleeves 302 and 304 are unthreaded from one another until at least one fitting member 110A or 110B is separated from ferrule 210. However, before external sleeves 302 and 304 are completely disengaged from one another, each sleeve 302 and 304 is restrained by restraining clips 326 placed in grooves 144A and 144B.

As external sleeves 302 and 304 are loosened, the outward pressure on restraining clips 326 (which are attached to fitting members 110A and 110B) force one or both tapered ridges 118A or 118B out of sealing engagement with sealing member channels 228A or 228B. Thus, the seal between fitting members 110A or 110B and ferrule 210 is broken before external sleeves 302 and 304 are completely unthreaded from one another. In this way, restraining clips 326 assist the operator to disassemble the embodiment.

The restraining effect of the restraining clips 326 serves an important safety function in case any residual pressure remains in the pipe union assembly. If sufficient residual pressure is present, fitting members 110A or 110B may be forced out of sealing engagement with sealing member 210 as soon as external sleeves 302 and 304 are slightly loosened. However, since external sleeves 302 and 304 are still substantially threaded to each other, tapered ridges 118A and 118B and sealing member channels 228A and 228B, respectively, are held in close proximity to one another and the residual pressure is allowed to escape gradually.

The presence of escaping pressure alerts the operator of the hazardous pressure remaining in the system. By this construction of the present invention, an operator is protected from an "exploding" pipe union which is created when all the restraints on the pipe union assembly are released and the internal pressure "blows apart" the union.

The following examples are given to illustrate particular devices and methods within the scope of the present invention but they are not intended to limit the scope of the present invention.

EXAMPLE 1

A device within the scope of the present invention substantially similar to the embodiment illustrated in FIG. 1 was constructed. The attributes of the subject device were as follows:

| Interior Diameter: | ¼ inch |
| End Fitting Material: | 304 SS |
| Ferrule Material: | AL 7075 |
| Angle of Sealing Interface: | 8° |

The device was hand tightened at about 27° C. and subjected to a hydrostatic test. During the test a liquid was introduced into the device at 5000 psi. The test was repeated six times with the device being disassembled and assembled between each test. Importantly, no leaks or pressure drops were detected.

EXAMPLE 2

A device within the scope of the present invention substantially similar to the device described in Example 1 was constructed and tested. The device was hand tightened at a temperature of 49° C. and subjected to a hydrostatic test at 5000 psi as described in Example 1. No leaks or pressure drops were detected.

EXAMPLE 3

A device within the scope of the present invention substantially similar to the device described in Example 1 was constructed. The attribute of the subject device which differed from the attributes of the device of Example 1 was the ferrule material which was AL 2024.

The device was subjected to an experimental field test where it was repeatedly assembled and disassembled by hand at room temperature of about 25° C. during normal use. During the test, liquid nitrogen at least as low as −190° C. was conveyed by the device. Even though the device underwent repeated thermal cycles of over 200° C., no leaks were detected.

B. A Second Presently Preferred Embodiment

Figure 8:
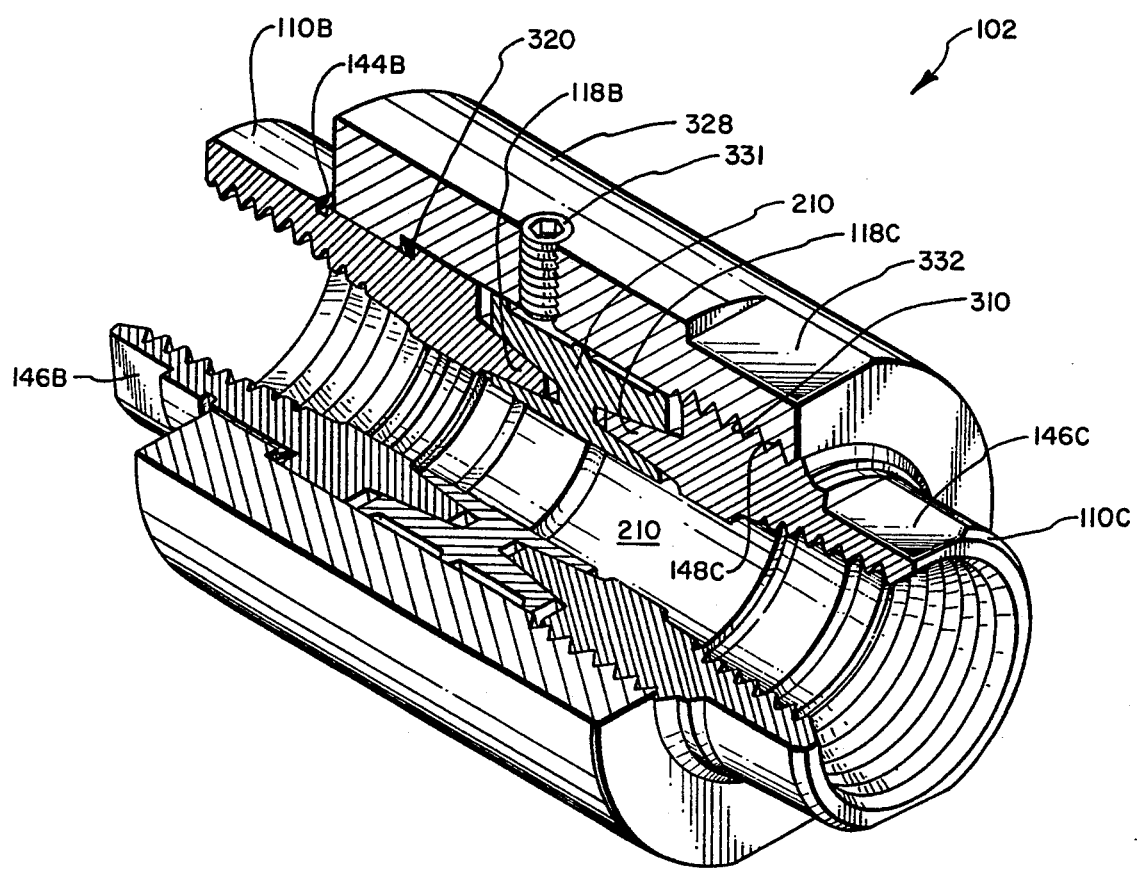
FIG. 8 is a partially cutaway perspective view of a second presently preferred embodiment of the present invention which is similar to the embodiment illustrated in FIG. 1 but which utilizes only a single external sleeve.

The major structural features of a second embodiment within the scope of the present invention are illustrated in FIG. 8 and are generally designated 102. Many of the structures of the second embodiment are substantially similar to those discussed in connection with the embodiment illustrated in FIGS. 1-7. While those structures which are clearly similar to previously described structures will not be described again, the differences between the two embodiments will be brought out in the following discussion.

The embodiment illustrated in FIG. 8 is configured so that only a single external sleeve is necessary. Fitting member 110B is substantially the same in both FIG. 8 and FIG. 1; however, male external sleeve 304 and female external sleeve 302 have been replaced by single female threaded sleeve 328 illustrated in FIG. 8. Female threaded sleeve 328 engages fitting member 110B in a fashion similar to that described in connection with male external sleeve 304 and fitting member 110B as illustrated in FIG. 1.

Fitting member 110C, and tapered ridge 118C, are substantially identical to the previously described structures except that fitting member 110C is provided with threads 148C on its outer circumference. When assembled, threads 310 provided on female external sleeve 328, engage fitting member threads 148C. It will be appreciated that by use of a single external sleeve 328, the fabrication of, and also the use of, embodiment 102 may be simplified.

Fitting member 110B is provided with groove 144B for insertion of a restraining clip. It will be appreciated that the restraining clip (not shown in FIG. 8) still serves the important safety function of breaking the seal of the assembly before female threaded sleeve 328 may be completely unthreaded from fitting member 110C.

Fitting members 110B and 110C and female threaded sleeve 328 are provided with areas which are generally called "wrench flats" 146B, 146C, and 332, respectively. The wrench flats are provided in order to allow convenient grasping of the structures of the embodiment by a wrench, or other similar tool.

Since the present invention is well adapted for use both in cryogenic and high temperature applications, it is often necessary that the person disassembling the union must use a wrench or other tool since contact with the embodiment at extreme temperatures would cause personal injury. As will be appreciated by the foregoing description, even though the present invention may form an adequate seal for use at moderate pressures when hand tightened, the same device will contain much higher pressures when tightened using a wrench or a wrench-like apparatus.

The following examples are given to illustrate particular devices and methods within the scope of the present invention but they are not intended to limit the scope of the present invention.

EXAMPLE 4

A device within the scope of the present invention substantially similar to the embodiment illustrated in FIG. 8 was constructed. The attributes of the subject device were as follows:

| Interior Diameter: | ¼ inch |
| --- | --- |
| End Fitting Material: | 303 SS |
| Ferrule Material: | AL 2011T3 |
| Angle of Sealing Interface: | 8° |

The subject device was tightened at room temperature to 15 ft. lbs. and subjected to a hydrostatic test. During the test a liquid was introduced into the device at 1500 psi and then the pressure was increased by 500 psi every 10 minutes until a pressure of 10,000 psi was reached. No pressure loss or leaks were detected at any time during the test.

EXAMPLE 5

A device within the scope of the present invention substantially similar to the embodiment illustrated in FIG. 8 was constructed. The attributes of the subject device were as follows:

| Interior Diameter: | 2 inches |
| --- | --- |
| End Fitting Material: | C1040 |
| Ferrule Material: | C1020 |
| Angle of Sealing Interface: | 6° |

The subject device was tightened at room temperature to 300 ft. lbs. and subjected to a hydrostatic test. During the test a liquid was introduced into the device at 6000 psi and then the pressure was increased gradually until leakage was detected when the pressure reached 9500 psi. When the pressure reached 9500 psi the conventional pipe threads joining the fitting members to the pipe members failed thus concluding the test. However, no leakage from the device itself was detected.

EXAMPLE 6

A device within the scope of the present invention substantially similar to the device described in Example 5 was constructed, except the ferrule material was C1018.

The subject device was hand tightened at room temperature and subjected to a hydrostatic test. During the test a liquid was introduced into the device at a pressure of 1000 psi, No leaks or pressure drops were detected, even though the device was hand tightened.

EXAMPLE 7

A device within the scope of the present invention substantially similar to the device described in Example 5 was constructed.

The subject device was tightened to 300 ft. lbs. at about 26° C. and subjected to a hydrostatic test. During the test a liquid was introduced into the device at a pressure of 6000 psi. The device was left for a period of 14 hours during which the temperature dropped to 20° C. At that time it was noted that the pressure had dropped to 5000 psi. The 1000 psi pressure drop corresponds to the drop expected due to the decrease in temperature. Importantly, no leaks were detected.

EXAMPLE 8

A device within the scope of the present invention substantially similar to the device described in Example 5 was constructed, except the ferrule material was C4140.

The subject device was tightened to 300 ft. lbs. at about 25° C. and subjected to a hydrostatic test. During the test a liquid was introduced into the device at a pressure of 6000 psi. The device was left for a period of 14 hours during which the temperature increased to about 27° C. At that time it was noted that the pressure had increased to 6150 psi. The noted pressure increase corresponds to the expected increase due to the temperature rise. Importantly, no leaks were detected.

EXAMPLE 9

A device within the scope of the present invention substantially similar to the device described in Example 5 was constructed, except the ferrule material was C1020 and a coating comprising zinc electroplated to a thickness of 5/1000 to 10/1000 inch was provided on the ferrule.

The subject device was hand tightened at room temperature and subjected to a hydrostatic test. During the test a liquid was introduced into the device at a pressure of 2000 psi. At the end of 10 minutes a pressure drop of 25 psi was noted but no leaks were detected indicating that the pressure drop was due to fluctuations in the test equipment.

EXAMPLE 10

A device within the scope of the present invention substantially similar to the device described in Example 5 was constructed, except the angle of the sealing interface was 8°.

The subject device was tightened at room temperature to 300 ft. lbs. and subjected to a hydrostatic test.

During the test a liquid was introduced at a pressure of 6000 psi. After 12 minutes, the pressure had dropped to 4800 psi and a slight leak was detected. It was subsequently determined that the surface roughness of the ridge sides and channel walls exceeded the preferred maximum and that this was the cause of the lower than expected performance of the device. This example demonstrates the importance of proper surface roughness if maximum sealing is required.

EXAMPLE 11

A device within the scope of the present invention substantially similar to the embodiment illustrated in FIG. 8 was constructed. The attributes of the subject device were as follows:

| Interior Diameter: | 2 inches |
| --- | --- |
| End Fitting Material: | 304SS |
| Ferrule Material: | AL 2024 |
| Angle of Ridge Sides: | 8° |
| Angle of Channel Walls: | 10° |

The subject device was hand tightened at room temperature and subjected to a hydrostatic test. During the test a liquid was introduced into the device at a pressure of 500 psi. No pressure loss or leakage were detected after 10 minutes. However, the device failed to contain the liquid at pressures much above 500 psi. This example demonstrates the importance of properly matching the angle of the ridge sides and channel walls.

EXAMPLE 12

A device within the scope of the present invention substantially similar to the device described in Example 9 was constructed, except the angle of the sealing interface was 8°.

The subject device was hand tightened at room temperature and subjected to a hydrostatic test. During the test a liquid was introduced into the device at a pressure of 200 psi. No leaks were detected at 200 psi, but the device failed to contain the liquid when the pressure was increased much above 200 psi. It was subsequently determined that the cause of the lower than expected performance of this device was due to the zinc plating provided on the ferrule. The plating was found to be uneven, thus demonstrating the importance of the tolerance of the ridge side and channel wall angle and also of the proper surface roughness.

EXAMPLE 13

A device within the scope of the present invention substantially similar to the embodiment illustrated in FIG. 8 was constructed. The attributes of the subject device were as follows:

| Interior Diameter: | 2 inches |
| --- | --- |
| End Fitting Material: | C1020 |
| Ferrule Material: | C1020 |
| Ferrule Coating: | Zinc (electroplated 5/1,000 to 10/1,000 inch) |
| Angle of Sealing Interface: | 8° |

The subject device was hand tightened at room temperature and subjected to a hydrostatic test. During the test a liquid was introduced into the device at a pressure of 2000 psi. The device initially failed to contain the pressure. However, the device was disassembled and assembled several times and retested. Upon retesting, the device contained a pressure of psi over a period of 10 minutes with no pressure loss or leaks. It was concluded that the repeated assembly and disassembly improved the sealing function by reducing the surface roughness of the sealing surfaces.

EXAMPLE 14

Six devices within the scope of the present invention substantially similar to the embodiment illustrated in FIG. 8 were constructed. The attributes of the subject devices were as follows:

| Interior Diameter: | 2 inches |
| --- | --- |
| End Fitting Material: | C 1020 |
| Ferrule Material: | C 1040 |
| Angle of Sealing Interface: | 8° |

The subject devices were subjected to an experimental field test at an installation involved in tertiary recovery of oil by steam injection. The installation was located in northern Alberta, Canada. The devices were hand tightened at ambient temperatures as low as −50° C. Steam at 350° C. and 2250 psi was then injected into the device. Oil was then recovered through the devices at a pressure of 600 psi. The devices underwent four steam injection/oil recovery cycles. The devices were disassembled and reassembled between each cycle. No leaks were detected during the test.

EXAMPLE 15

A device within the scope of the present invention substantially similar to the embodiment illustrated in FIG. 8 was constructed. The attributes of the subject devices were as follows:

| Interior Diameter: | ¼ inch |
| --- | --- |
| End Fitting Material: | 304SS |
| Ferrule Material: | AL 2024 |
| Angle of Sealing Interface: | 8° |

The device was subjected to an experimental field test where it was repeatedly assembled and disassembled at room temperature by hand during normal use. During the test, liquid nitrogen at least as low as −190° C. was conveyed by the device. Even though the device underwent a thermal cycle of over 200° C., no leaks were detected.

C. A Third Presently Preferred Embodiment

Figure 9:
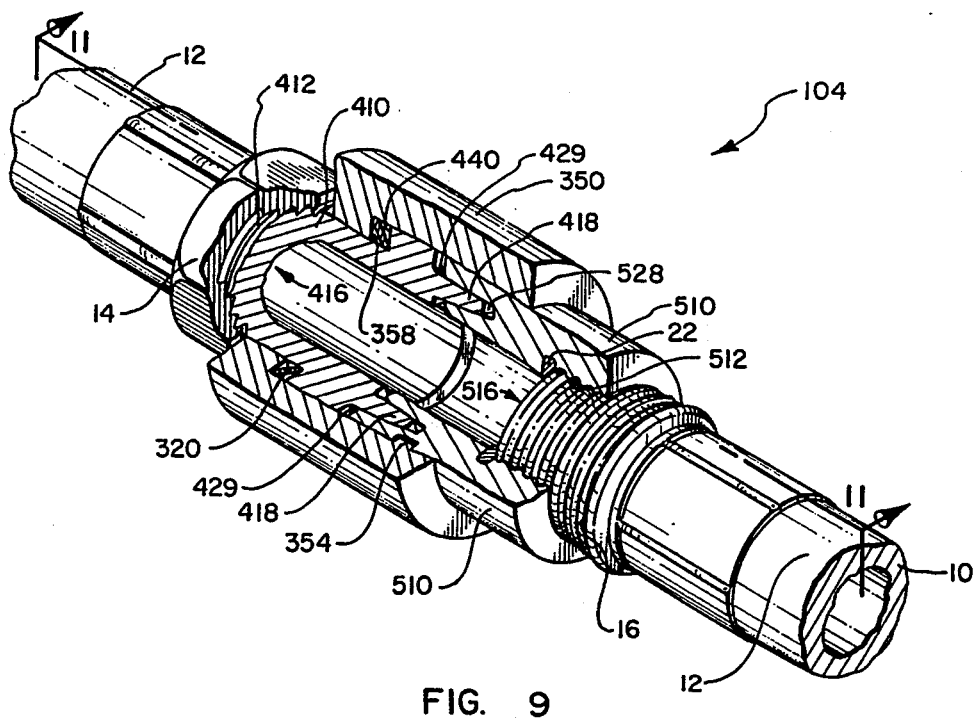
FIG. 9 is a partially cutaway perspective view of a third presently preferred embodiment of the present invention.
Figure 10:
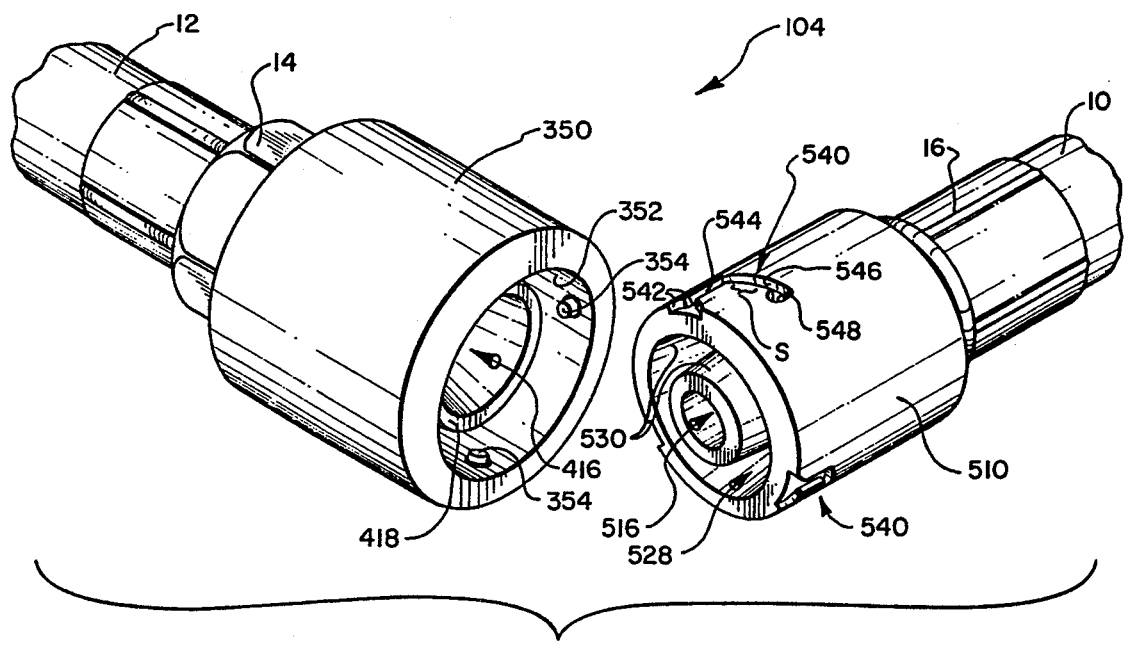
FIG. 10 is an exploded perspective view of the embodiment shown in FIG. 9.
Figure 11:
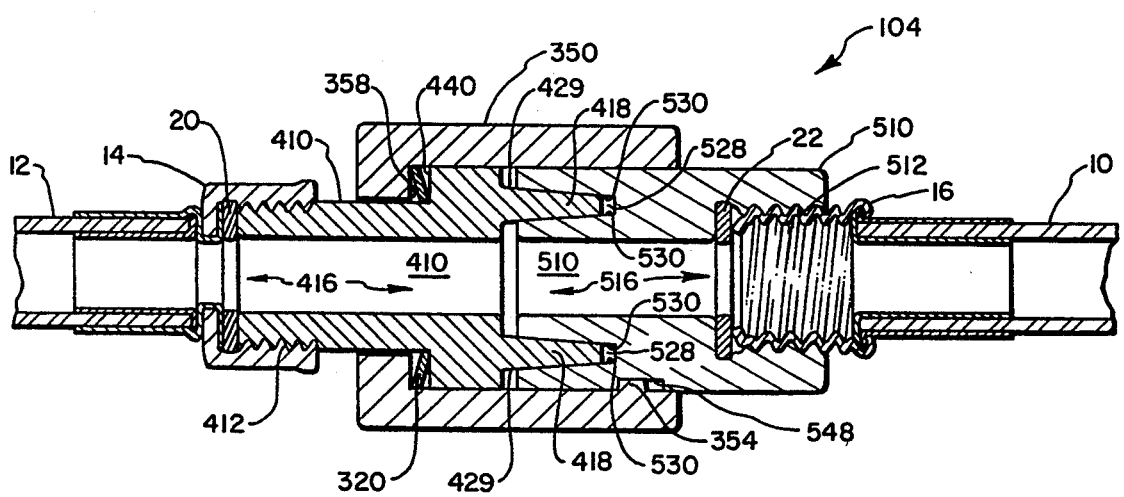
FIG. 11 is an elevated cross-sectional view of the embodiment shown in FIG. 9.

A third presently preferred embodiment within the scope of the present invention is illustrated in FIGS. 9–11 and is generally designated 104. FIG. 9 is a partially cutaway perspective view of this third preferred embodiment. Many of the structures incorporated into the third embodiment shown in FIG. 9–11 are very similar, or identical, to the structures used in the first embodiment previously described.

The embodiment shown in FIG. 9 includes one fitting member 410 and one sealing member 510. Fitting member 410 is provided with a tapered ridge 418 running perimetrically around the innermost end of fitting member 410 in a manner similar to tapered ridge 118A or 118B of the previously described embodiment. Sealing member 510 is provided with tapered channel 528 running parametrically around the innermost end of sealing member 510.

One female external sleeve 350 is provided with compressing edge 358 which biases compensating washer 320 against abutting edge 440 of fitting member 410. Sleeve 350 attaches to the external surface of sealing member 510 in a manner to be described in more detail hereinafter.

This third embodiment has fewer components than the previously described first embodiment and may be used in many of the same applications as the previously described embodiment. However, it is best suited for use in applications involving lower pressures and little thermal cycling. For example, as suggested by FIGS. 9–11, the embodiment may be used for providing an efficient union for connecting hoses, such as low pressure hydraulic hoses or water hoses. This third embodiment, is easier and less expensive to manufacture because of fewer components and is thus also easier to assemble and disassemble.

As shown in the perspective view of FIG. 9, the third embodiment includes fitting member 410 which is similar in construction to fitting member 110A or 110B of the first embodiment. Fitting member 410, as shown in FIG. 9, is provided with male threads 412 for connecting fitting member 410 to hose 12 by way of hose fitting 14, shown in FIG. 9.

Similar to the first embodiment, fitting member 410 of the third embodiment is provided with tapered ridge 418. However, only one fitting member and only one external sleeve (instead of two) are used to form the seal in the third embodiment. Thus, the third embodiment may be fabricated at a significantly lower cost than the first embodiment.

The considerations discussed above in connection with forming an adequate seal in the first embodiment, particularly regarding the angle of tapered ridge sides 429, and the materials from which fitting member 410 is fabricated, are substantially the same for this third embodiment.

For example, referring to FIG. 11, the angle of tapered ridge sides 429 in relation to the fitting member central axis is preferably within the range of about 2° to about 12°, with the most presently preferred value being about 8°. Furthermore, the hardness differential between the material comprising tapered ridge sides 429 and sealing member channel walls 530 should be within the range of about 1 to about 300 Brinell units with the most presently preferred differential being from about 10 to about 150 Brinell units. Still further, as discussed in detail with respect to the first embodiment, fabricating fitting member 410 and sealing member 510 of materials having different temperature expansion coefficients will also promote proper sealing of the second embodiment when thermal cycles are encountered.

Since the third embodiment is primarily contemplated for use in applications involving less severe temperatures and pressures than the first embodiment, consideration of all of the features used in the first embodiment may not be necessary in order to provide for proper sealing in the practical operation of the second embodiment.

As explained above, the angle at which tapered ridge sides 429 and channel walls 530 are oriented is preferably in the range from about 6° to about 8°; however, tolerances need not be close if the embodiment is used in only low pressure conditions.

Furthermore, if the temperatures and pressures which the third embodiment is subjected to are not extreme, the considerations relating to the hardness differential and the thermal expansion coefficients of the components may be applied less rigorously than with the first or second embodiment. For example, in some low pressure and stable temperature situations, it may not even be necessary to use materials having a hardness differential or having different thermal expansion coefficients in order to provide a proper seal.

Sealing member 510 of the third embodiment, as illustrated in FIG. 11, differs from sealing member 210 of the first embodiment in that hose 10 of the third embodiment is connected directly to sealing member 510 by way of a threaded connection between hose fitting 16 and sealing member threads 512. A gasket 22 may also optionally be provided. The sealing member tapered channel, generally designated 528 in FIG. 10 and also shown in FIG. 10, is preferably structured using the same considerations as discussed in connection with sealing member 210 of the first embodiment.

In the third embodiment, both fitting member 410 and sealing member 510 may be fabricated of materials corresponding to the materials from which the fitting member and sealing member are fabricated in the first embodiment. However, if the operating conditions do not involve extreme temperatures and pressures, it will be appreciated that the third embodiment may be fabricated of materials such as plastics or other materials which are easily molded or machined.

FIG. 10 represents an exploded perspective view of the embodiment shown in FIG. 9. FIG. 10 shows tapered ridge 418, sealing member tapered channel 528 and interior cavity 516 of sealing member 510. The outer surface of sealing member 510 which is preferably cylindrical, is provided with three substantially L-shaped grooves, generally designated 540 (two of which are shown in FIG. 9) which allow the third embodiment to be rapidly assembled or disassembled.

Each groove 540 receives a corresponding external sleeve pin 354 which is mounted to the interior surface of external sleeve 350, the interior surface of sleeve 350 being preferably cylindrical and of substantially the same diameter as the outer surface of sealing member 510. The pin 354 and groove 540 arrangement allows the embodiment to be quickly assembled or disassembled by essentially twisting the external sleeve and fitting member in opposite directions; this groove and pin arrangement has thus been termed a "quick twist coupling."

As can be seen best in FIG. 10, grooves 540 are provided with a first portion 542 which is widened so as to form a mouth to easily receive pin 354. Groove 540 is also provided with a second portion 544 which is substantially perpendicular to the end of sealing member 510 and which allows pin 354 to travel freely for a distance before contacting a third portion 546 which preferably forms an angle greater than 90°, preferably about 96°, with second portion 544. Groove 540 terminates with recess 548 which serves to lock pin 354 in place.

Once pin 354 is inserted through first groove portion 542 and into second groove portion 544 so as to contact the junction between groove portion 544 and 546, sealing member 510 and fitting member 410 are rotated in opposite directions such that each pin 354 slides along the third portion 546 of its respective groove 540. Since third groove portion 546 is oriented at an angle of about 96° from second groove portion 544, external sleeve 350 moves radially towards sealing member 510 and is "pulled onto" sealing member 510 as they are rotated to move pins 354 along third groove portions 546.

To make best use of the quick twist coupling feature of the third embodiment, it is preferable that tapered ridge 418 and tapered channel 528 first make sealing engagement when pins 354 are situated somewhere within the third groove portion 546 which is indicated by the bracket marked S. By positioning pins 354 and grooves 540 such that sealing engagement occurs when pins 354 are in the area marked S provides for a more secure seal and provides for a mechanism to subsequently break the seal as will be explained in more detail hereinafter.

The recess 548 located at the end of each third groove portion 546 serves to secure its respective pin 354 in place once pin 354 reaches recess 548. With grooves 540 being structured as described herein, tapered ridge 418 and tapered channel 528 are held in sealing engagement once pins 354 are locked into recesses 548 of grooves 540.

FIG. 11 is a cross-sectional view of the third embodiment shown in FIG. 9. Compensating washer 320 shown in FIG. 11 may be identical to compensating washer 320 shown in FIG. 5. Compensating washer 320, shown best in FIG. 11, serves a dual purpose in the third embodiment. As discussed previously in connection with the first embodiment, compensating washer 320 serves to provide compensation due to "creeping" (degradation of the seal due to thermal contraction) which occurs at low temperatures.

Importantly, compensating washer 320 in the third embodiment also serves to bias external sleeve 350 in a direction which will hold pins 354 in groove recesses 358 and thus provides the tension necessary for proper operation of the quick twist coupling. In this regard, when pins 354 are seated in groove recesses 358, washer 320 biases fitting member 410 towards sealing member 510, and thus assists in forming a proper seal.

As can be seen best in FIG. 11, fitting member 410 is provided with an abutting edge 440 while external sleeve 350 is provided with a compressing edge 358. One pin 354 and one groove recess 548 can be seen in the lower portion of FIG. 10. Compensating washer 320 is positioned so that external sleeve compressing edge 358 and abutting edge 440 are urged apart. Pins 354, grooves 540, and compensating washer 320, are arranged such that sealing contact between tapered ridge 418 and tapered channel 528 occurs when pins 354 are situated in third groove portion 546 which is designated S in FIG. 10. This arrangement provides that when pins 354 are received in groove recesses 548 shown best in FIG. 10, compensating washer 320 is partially or fully compressed.

By the above-described arrangement, fitting member ridge 418 is held in tight sealing arrangement with sealing member channel 528. When pins 354 are received in groove recesses 548, compensating washer 320 must be compressed even further to release the tension on pins 354 and remove pins 354 from recesses 548. When the third embodiment is disassembled, tapered ridge 418 and tapered channel 258 will be forced from sealing engagement once pins 354 pass through the area of third groove portion 546 which is designated S. Thus, the configuration of grooves 540 helps to break the seal when the external sleeve 350 and sealing member 510 are counter-rotated to disassemble the union.

It should be understood that compensating washer 320 may be replaced by structures other than that shown and described in connection with FIG. 11 above. For example, if the embodiment is to be used only under moderate temperature and pressure conditions, compensating washer 320 may be a washer of a resilient material, such as rubber. Depending upon the application, those skilled in the art will be able to determine what alternative structures and materials may be used for compensating washer 320.

The most important criteria when selecting a material for compensating washer 320 is that washer 320 must be compressible so as to allow pins 354 to seat in groove recesses 548 while urging fitting member ridge 418 into sealing engagement with sealing member channel 528. This arrangement provides a coupling which is highly resistant to loosening due to vibration. Thus, when the above-described quick-twist coupling feature is used, there is often no need to include set screws, such as those shown in FIGS. 2 and 11 at 330.

The following examples are given to illustrate particular devices and methods within the scope of the present invention but they are not intended to limit the scope of the present invention.

EXAMPLE 16

A device substantially similar to the embodiment illustrated in FIG. 9 was constructed except a threaded external sleeve was used rather than the "pin and groove" arrangement shown in FIG. 9. The parameters of the subject device were as follows:

| | |
|---|---|
| Interior Diameter: | 2 inches |
| Fitting Member and Sealing Member Material: | C1020 |
| Angle of Sealing Interface: | 6° |

The subject device was tightened to 300 ft. lbs. at room temperature and subjected to a hydrostatic test. During the test a liquid was introduced into the device at a pressure of 6,000 psi. After a period of 40 minutes no loss of pressure or leaks were detected.

EXAMPLE 17

A device substantially similar to the embodiment illustrated in FIG. 9 was constructed except a threaded external sleeve was used rather than the "pin and groove" arrangement shown in FIG. 9. The attributes of the subject device were as follows:

| | |
|---|---|
| Interior Diameter: | 2 inches |
| Fitting Material: | C1020 |
| Sealing Member Material: | C1020 provided with a zinc plating 5/1000 to 10/1000 inches thick |
| Angle of Sealing Interface: | 8° |

The subject device was hand-tightened at room temperature using handles 4.5 inches long attached to the external sleeve of the device, and subjected to a hydrostatic test. During the test, a liquid was introduced into the device at a pressure of 2,500 psi. While the device first failed to contain this pressure, it contained this pressure after it was disassembled and reassembled several times and then retested. It was subsequently determined that the repeated assembly and disassembly decreased the surface roughness (i.e., improved the surface finish) of the ridge sides and the channel walls thus improving the seal.

F. A Fourth Presently Preferred Embodiment

Figure 12:
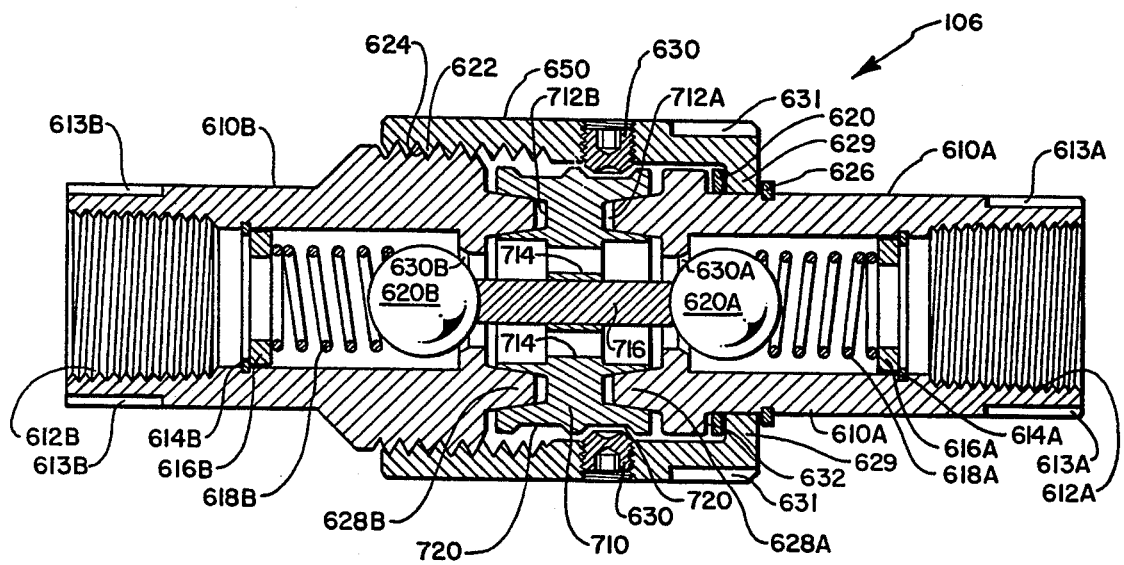
FIG. 12 is an elevated cross-sectional view of a fourth presently preferred embodiment of the present invention which automatically checks the flow of fluid upon disassembly of the embodiment.
Figure 13:
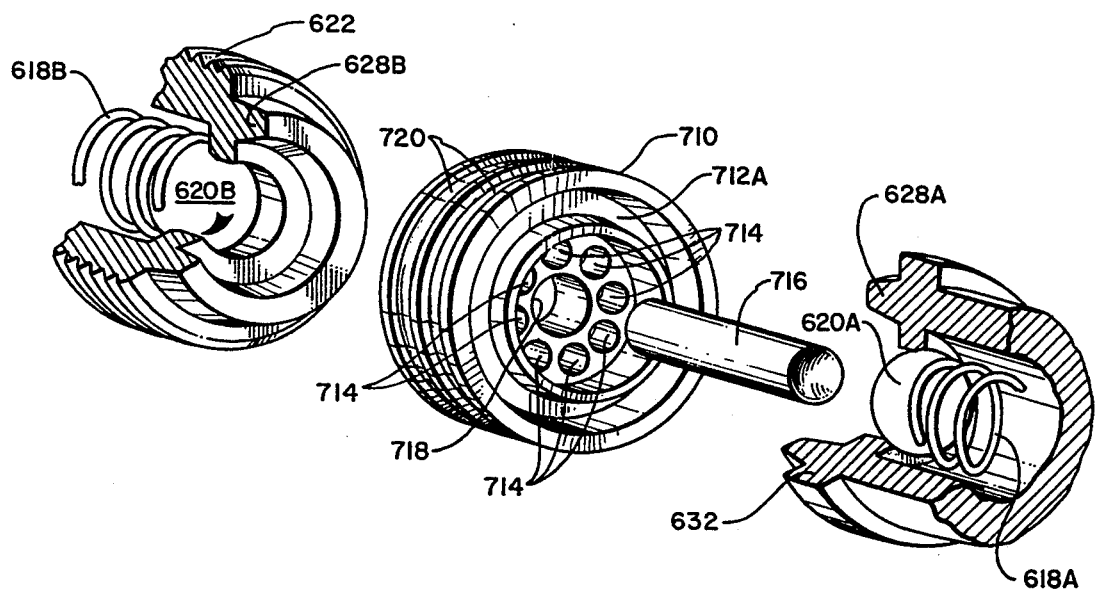
FIG. 13 is an exploded, partially cutaway perspective view of the embodiment of FIG. 12.

FIGS. 12 and 13 illustrate a fourth presently preferred embodiment of the present invention, generally referred to at 106. As done previously in this disclosure, in order to simplify the description of this embodiment the structures associated with fitting members 610A and 610B have been provided with an appropriate A or B letter which corresponds to fitting member 610A and fitting member 610B, respectively. Also, some illustrated structures associated with sealing member 710 have been designated by an appropriate A or B letter if the structure is particularly associated with fitting member 610A or 610B.

FIG. 12 is an elevated cross-sectional view of a fourth presently preferred embodiment within the scope of the present invention which is particularly adapted for use in applications where fluid flow through the pipes connected to the union must be checked whenever the union assembly is disassembled. In the embodiment of FIG. 12, structures are provided which automatically check the flow of fluid through each of the fitting members whenever the union is disassembled.

The flow checking function of the embodiment illustrated in FIGS. 12 and 13 is particularly advantageous in many applications. For example, automatically halting the flow of fluid, either a liquid or a gas, from a fitting member upon disassembly of the embodiment may serve a significant safety function. Such may be the case when a high temperature fluid under pressure is flowing through the pipe union assembly and an operating mechanic might be injured if significant contact with the fluid were to occur.

The flow checking function of the embodiment illustrated in FIGS. 12 and 13 also solves problems that have been faced in various industries. For example, when fabricating structural parts of various kinds using composite materials, particularly advanced composite materials using exotic fibers bonded into a resin matrix, it is often necessary to vacuum seal the composite part against a positive mold using an air-tight collapsible vacuum bag.

Once the composite materials have been placed in a mold, a vacuum bag is placed around the bag and after the part has attained it finished shape, all of the gases are evacuated from the bag. The bag and the composite material contained therein is then placed in an autoclave and subjected to high temperatures, often 600° C. and above, to cure the material. Creating and then maintaining a vacuum within the bag at the high temperatures experienced in an autoclave has posed a significant problem when using prior art devices.

By using the embodiment of FIGS. 12 and 13 the problems experienced with the prior art devices are alleviated. In use, the present invention is connected to the bag and then to a vacuum supply line. After the interior of the bag has reached the proper pressure, an operating mechanic merely disassembles the pipe union assembly. The portion of the pipe union assembly connected to the bag automatically seals the vacuum within the bag and the portion of the assembly connected to the vacuum supply line automatically seals the supply line. Importantly, the portion of the pipe union which is attached to the bag remains attached and seals the vacuum within the bag throughout the high temperature curing process.

Significantly, since the curing step of composite materials is carried out at high temperatures, the all metal construction of the embodiment of FIGS. 12 and 13 allows the embodiment to withstand the high temperatures of the curing step. Not only does the fourth embodiment maintain a secure seal while undergoing the severe temperature changes and thermal cycling, but the embodiments may also be repeatedly used. The ability to withstand high temperature while maintaining a seal and to be repeatedly used in such applications is a great advantage over previously available devices. Thus, the embodiment of FIGS. 12 and 13 provides a significant advance over the prior art in the area of composite materials fabrication and other areas having similar requirements.

Importantly, the embodiment illustrated in FIGS. 12 and 13 may be used to applications utilizing either negative pressures (i.e., a vacuum) or positive pressures (i.e., pressures above atmospheric pressure).

Referring now to the cross-sectional view of FIG. 12, the principle structures of the fourth embodiment will be explained. As was the case with several of the previously described embodiments, the fourth embodiment includes two fitting members 610A and 610B which share some similar structures. The differences between the two fitting members will become apparent in the following description. It will be appreciated that the features of the embodiment represented in FIGS. 12 and 13 may be incorporated into other embodiments of the present invention, for example, those including only one fitting member and one sealing member.

Importantly, the earlier described considerations regarding the fabrication of the sealing surfaces and the materials from which the components are constructed apply in the embodiment of FIGS. 12 and 13 also. Such considerations include the angle of the sealing surfaces, the surface roughness of the sealing surfaces, tolerance of the sealing surface angle, the hardness differential of the sealing surfaces, the coefficient of thermal expansion of the union components, as well as other considerations.

As represented in FIG. 12, two fitting members 610A and 610B are in sealed engagement with a sealing member or sealing ferrule 710. At a first end of each of fitting members 610A and 610B, pipe threads 612A and 612B, respectively, and wrench flats, 613A and 613B, respectively, are provided to allow fitting members 610A and 610B to be attached to pipes (not shown in FIG. 12). Pipe threads 612A and 612B are representative of the many structures which may be used to provide a means for attaching the fitting member to a pipe member.

Also represented in FIG. 12 is a single external sleeve 650. The single external sleeve 650 functions to press tapered ridges 628A and 628B of the fitting members 610A and 610B into sealing engagement with the corresponding tapered channels 712A and 712B of sealing member 710 as has been explained previously in connection with other embodiments of the present invention. The internal circumference of one end of the external sleeve 650 is provided with threads 624 which engage threads 622 provided on the external circumference of fitting member 610A.

It should be appreciated that an important feature of all the embodiments of the present invention is the ability of the embodiments to be reused many times. Particularly in the case of the embodiment illustrated in FIGS. 12 and 13, the ability to function in the high temperature environment of an autoclave and also be reused many times is a great advantage not obtainable from previously available devices.

As external sleeve 650 is threaded onto fitting member 610A, a foot portion, indicated at 629 in FIG. 12, of external sleeve 650 compresses a compensating washer, illustrated at 620. Compensating washer 620, which functions similarly to the compensating washers associated with earlier described embodiments, is pressed against an abutting edge, shown at 632, formed on fitting member 610A. In this way, fitting members 610A and 610B are pressed into contact with sealing member 710.

As discussed previously in connection with the first embodiment, compensating washer 620 serves to provide compensation due to "creeping" (degradation of the seal due to thermal contraction) which occurs at low temperatures. Wrench flats 631 are provided on external sleeve 650 in case it is desirable to use a tool to loosen the pipe union assembly due to the high or low temperature of the union.

As similarly described in connection with the previously illustrated embodiments, a restraining clip, 626 in FIG. 12, is provided to ensure that the seal between one of the fitting members and sealing member 710 is broken before external sleeve threads 624 are disengaged from fitting member threads 622. Restraining clip 626 also serves to keep fitting member 610B and external sleeve 650 together when the embodiment of FIGS. 12 and 13 is disassembled.

Still referring to FIG. 12, set screws 630 are threaded into bores provided in external sleeve 650 so they loosely extend into sealing member recess 720 but so they do not make actual contact with sealing member 710 after assembly of the embodiment. In this way, sealing member 710 is "loosely" held in contact with fitting member 610B so as to be held ready for alignment and insertion of tapered ridge 628B into tapered channel 712B. Also, since sealing member 710 is held loosely captive by set screws 630, it will not be misplaced when the embodiment is disassembled. However, sealing member 710 should still be allowed to rotate freely during use so set screws 630 should not be inserted too far.

Further represented in FIG. 12 are those structures which function as a check means for halting the flow of fluid through the respective fitting member. By way of example and not by limitation, check balls 620A and 620B, springs 618A and 618B, spring retaining ring 616A and 616B, spring retaining clip 614A and 614B, and ball seats 630A and 630B, function as a check means in the embodiment illustrated in FIGS. 12 and 13. The check balls and the ball seats also function together as a valve means. The springs illustrated in FIGS. 12 and 13 function as a biasing means to ensure that the valve formed by the check balls and ball seats is normally closed.

As explained earlier, the embodiment of FIGS. 12 and 13 allows fluid to flow through the union assembly when the two fitting members 610A and 610B are both in sealing engagement with the sealing member 710. Thus, associated with sealing member 710 is a disable rod 716 which in the illustrated embodiment functions as a means for disabling the fluid checking function of check balls 620A and 620B.

As shown in FIG. 12, by way of example and not by limitation, when the embodiment is assembled, a fluid path is established through fitting member 610A, past check ball 620A, through the plurality of bores 714 provided in sealing member 710, past check ball 620B, and through fitting member 610B.

The concave shape of the end of the disable rod can be seen best in FIG. 13. It will be appreciated that the length of disable rod 716 may be varied to increase or decrease the cross sectional area of the fluid flow path or to vary the speed at which the flow of fluid is checked when the union is disassembled.

Referring now to FIG. 13, an exploded, partially cut-away perspective view of the fourth presently preferred embodiment is provided. As illustrated in FIG. 15, when the pipe union is disassembled, check balls 620A and 620B are pressed into their respective ball seats (630A and 630B in FIG. 12) by springs 618A and 618B to halt the flow of fluid through fitting members 610A and 610B. Ball seats 630A and 630B are formed to provide a fluid tight seal in cooperation with check balls 620A and 620B.

As shown best in FIG. 13, sealing member 710 is provided with a plurality of bores 714 which provide a fluid flow path through the sealing member. Also provided in sealing member 710 is a rod guide bore, shown at 718, into which disable rod 716 is inserted. The rod guide bore 718 serves to properly position disable rod 716 against the check balls.

In use, the embodiment illustrated in FIGS. 12 and 13 provides many heretofore unavailable advantages. For example, after the fitting members 610A and 610B have been attached to pipe members, fluid may be introduced into the pipe members and no leakage will occur through the fitting members because check balls 620A and 620B are firmly held against ball seats 630A and 630B, respectively, when the pipe union is disassembled (as shown in FIG. 13.

When it is desired to halt the fluid flow through the pipe union, it is merely necessary to begin to disassemble the pipe union. As the external sleeve (650 in FIG. 12) is unthreaded, the fitting members will be separated from the sealing member and, depending on the length of the disable rod (716 in FIG. 13) the check balls will once again firmly rest on their respective ball seats checking the flow of fluid through the fitting members.

Those having skill in the pertinent arts will readily be able to fabricate or obtain components which will serve the above described purposes and functions, or slightly different purposes and functions, which are within the scope of the present invention. It is expected that the many different embodiments within the scope of the present invention may be fabricated to serve in particular applications.

EXAMPLE 18

A device substantially similar to the embodiment illustrated in FIG. 12 was constructed. The parameters of the subject device were as follows:

| | |
|---|---|
| Interior Diameter: | ½ inch |
| Fitting Member Material: | 304SS |
| Sealing Member Material: | Brass 360 |
| Check Balls: | Stainless steel |

The subject device was attached to a collapsible bag containing a bagged composite material structural part. The subject device was also connected to a source of vacuum and the gases in the bag were removed. Once a vacuum was achieved in the bag, the bag and the attached portion of the subject device were placed in an autoclave and subjected to a temperature of 670° C. at 190 p.s.i. for 24 hours. The autoclave was then cooled to approximately ambient temperature and the temperature and pressure was again increased. The cooling and heating cycle of the autoclave was repeated once more. The bag was then removed from the autoclave and the loss of vacuum from within the bag was measured. The loss of vacuum which occurred when using the subject device was only 0.005 inches of Hg per minute.

When prior art devices were subjected to this test, a vacuum loss of over 8.55 inches of Hg per minute was generally experienced.

As will now be appreciated, the fourth embodiment is particularly adapted for use where the flow of fluid through the pipe union assembly must be halted when the embodiment is disassembled. Using the teachings provided herein, embodiments of the present invention may be devised to halt the fluid flow from just one or both fitting members using structures other than those represented in FIGS. 12 and 13.

G. Summary

It will be appreciated that the above-described embodiments are a significant advance over the pipe couplings available in the prior art.

As mentioned previously, some of the primary considerations which must be implemented when practicing the present invention include the angle of the sealing surfaces, the surface roughness of the sealing surfaces, tolerance of the sealing surface angle, the hardness differential of the sealing surfaces, the coefficient of thermal expansion of the union components, as well as other considerations which were previously mentioned or which will be appreciated by those skilled in the art. Importantly, the pipe union assembly of the present invention provides the advantage of being quickly assembled and disassembled by hand or with simple tools.

Also of importance is that the present invention provides a metal-to-metal seal which may be used at extremely hot or extremely cold temperatures. Also, the present invention provides a pipe union which may be assembled at the ambient temperature and still maintain a secure seal over a wide range of temperatures and pressures. Furthermore, a pipe union made in accordance with the present invention may be reused many times due to, among other features, the use of a rigid sealing member, rather than a flexible sealing member.

Also, the rigid sealing member is extremely resistant to damage caused by over tightening. Embodiments of the present invention also provide protection to a person disassembling the pipe union by allowing residual pressure to be released in a controlled fashion rather than allowing the residual pressure to "blow apart" the pipe union. These and other benefits are gained by use of the pipe union assemblies of the present invention.

Moreover, the present invention may be adapted for use in various industries. One described embodiment is particularly adapted for applications when the flow of fluid through the pipe union must be checked or halted automatically upon disassembly of the union and reinitiated upon reassembly of the pipe union.

It will be appreciated that the apparatus of the present invention are capable of being incorporated in the form of a variety of embodiments, only a few of which have been illustrated and described above. The invention may thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A pipe union assembly comprising:
    a first hollow fitting member having means for attaching the first fitting member at a first end thereof to a first pipe member;
    a truncated tapered ridge formed at the periphery of a second end of the first fitting member, the truncated tapered ridge having two opposing flat sides, each of said sides being oriented at an angle in the range from about 6° to about 8° with respect to a central axis of the first fitting member and wherein the tapered channel is defined by two flat tapered walls, said walls being oriented with respect to a central axis of the sealing means at an angle which is equal to the angle at which the tapered ridge sides are oriented with respect to the central axis of the fitting member;
    first check means for automatically halting the flow of fluid from the first pipe member through the first fitting member when the pipe union is disassembled;
    hollow rigid sealing means having a first tapered channel peripherally formed on a first end, the first tapered channel being configured to receive into sealing engagement the tapered ridge such that the truncated tapered ridge does not completely penetrate the first tapered channel, the hollow rigid sealing means allowing fluid flow therethrough;
    securing means for selectively applying pressure to the first hollow fitting member to hold the truncated tapered ridge in sealed engagement with the first tapered channel such that the sealing engagement is maintained while the pipe union undergoes significant thermal cycling; and
    disabling means for disabling the first check means when the pipe union is assembled and the truncated tapered ridge is in sealing engagement with the first tapered channel such that fluid is allowed to flow through the first fitting member when the pipe union is assembled but fluid flow through the first fitting member is automatically halted upon disassembly of the pipe union assembly.

2. A pipe union assembly as defined in claim 1 wherein the hollow rigid sealing means comprises means for attaching the hollow sealing means at a second end thereof to a second pipe member.

3. A pipe union assembly as defined in claim 1 further comprising:
    a second hollow fitting member having means for attaching the second fitting member at a first end thereof to a second pipe member; and
    a truncated tapered ridge formed at the periphery of a second end of the second fitting member.

4. A pipe union assembly as defined in claim 3 wherein the hollow rigid sealing means further comprises:
    a second tapered channel peripherally formed on a second end of the hollow rigid sealing means, the second tapered channel being configured to receive into sealing engagement the tapered ridge formed on the second hollow fitting member such that the truncated tapered ridge does not completely penetrate the second tapered channel; and wherein the securing means further comprises means for selectively applying pressure to the first and the second hollow fitting members so as to hold both of the truncated tapered ridges in sealing engagement with the first and second tapered channels, respectively.

5. A pipe union assembly as defined in claim 3 further comprising second check means for automatically halting the movement of fluid from the second pipe member through the second fitting member when the pipe union is disassembled.

6. A pipe union assembly as defined in claim 5 wherein the disabling means further comprises means for disabling the second check means.

7. A pipe union assembly as defined in claim 1 wherein the first check means comprises:
valve means for shutting and opening the hollow fitting members to fluid flow therethrough, and
biasing means for maintaining the valve means in a normally closed position such that the valve means is shut when the pipe union is disassembled.

8. A pipe union assembly as defined in claim 7 wherein the valve means comprises
a check ball disposed within the first fitting member; and
a ball seat formed within the first fitting member.

9. A pipe union assembly as defined in claim 8 wherein the disabling means comprises a rod held in axial alignment with the check ball such that the check ball is moved away from the ball seat when the pipe union is assembled.

10. A pipe union assembly as defined in claim 9 wherein the rod is removable.

11. A pipe union assembly as defined in claim 8 wherein the sealing means comprises a rod guide bore positioned axially within the sealing member.

12. A pipe union assembly as defined in claim 7 wherein the biasing means comprises a spring.

13. A pipe union assembly as defined in claim 1 wherein the disabling means comprises a rod disposed within the sealing means.

14. A pipe union assembly as defined in claim 1 wherein the tapered ridge comprises two opposing flat sides, said ridge sides being fabricated from a material having a Brinell hardness value in the range from about 5 to about 200 Brinell units different than the Brinell hardness value of the material from which the tapered channel walls are fabricated, the Brinell units being measured on the Brinell hardness scale.

15. A pipe union assembly as defined in claim 1 wherein the tapered ridge comprises two opposing flat sides, said ridge sides being fabricated from a material having a Brinell hardness value in the range from about 10 to about 150 Brinell units different than the Brinell hardness value of the material from which the tapered channel walls are fabricated, the Brinell units being measured on the Brinell hardness scale.

16. A pipe union assembly as defined in claim 1 wherein the securing means comprises an external sleeve, the external sleeve comprising a threaded interior portion and wherein the first fitting member comprises a threaded exterior portion adapted to engage the threaded interior portion.

17. A pipe union assembly as defined in claim 1 wherein the first and second fitting members, the sealing member, the securing means, and the disabling means are all comprised of materials suitable for use at temperatures over 200° C.

18. A pipe union assembly as defined in claim 1 further comprising restraining means for inhibiting the releasing of the securing means until the sealing engagement between the tapered ridge and the tapered channel is broken before the pipe union is completely disassembled to prevent the uncontrolled escape of residual pressure within the pipe union.

19. A pipe union assembly as defined in claim 1 wherein the sealing means is fabricated from a material having a coefficient of thermal expansion which is less than the coefficient of thermal expansion exhibited by the material from which the first fitting member is fabricated.

20. A pipe union assembly as defined in claim 1 wherein the sealing means is fabricated from a material having a coefficient of thermal expansion which is greater than the coefficient of thermal expansion exhibited by the material from which the first fitting member is fabricated.

21. A pipe union assembly as defined in claim 1 further comprising compensating means for compensating for thermal contraction of the rigid sealing means and the first fitting member so as to maintain the rigid sealing means in sealing engagement with the first fitting member at temperatures lower than the ambient assembly temperature.

22. A pipe union assembly including an integral fluid flow check function comprising:
a first hollow fitting member having means for attaching the fitting member at a first end thereof to a first pipe member;
a truncated tapered ridge comprising two nonparallel sides, the truncated tapered ridge formed at the periphery of the second end of the first fitting member, at least one of the nonparallel sides being oriented at an angle in the range from about 2° to about 12° in relation to a central axis of the first fitting member;
first check means for halting the movement of fluid through the first hollow fitting member;
a hollow rigid sealing means having means for attaching the hollow rigid sealing means at a first end thereof to a second pipe member;
a tapered channel formed at the periphery of a second end of the hollow rigid sealing means, the tapered channel comprising two nonparallel walls oriented at an angle in the range from about 2° to about 12° in relation to a central axis of the hollow rigid sealing means, the walls of the tapered channel being configured to sealingly engage the rigid side of the truncated tapered ridge;
the channels walls of the tapered channel being sufficiently rigid and having a hardness value in the range from about 5 Brinell units to about 200 Brinell units different than the hardness value of the nonparallel rigid sides of the truncated tapered ridge such that both the nonparallel rigid sides of the truncated tapered ridge and the rigid channel walls of the tapered channel resist any substantial macroscopic deformation when the truncated tapered ridge is sealingly engaged within the tapered channel and the sealing engagement is maintained as the pipe union assembly is subjected to thermal cycling, thereby maintaining the seal of the pipe union assembly when repeatedly subjected to substantial changes in temperature over time; and disabling means for disabling the first check means when the truncated tapered ridges are in sealing engagement with a respective one of the tapered channels such that fluid is allowed to flow through the first fitting member and the sealing member and fluid flow from the first pipe member through the first fitting member is automatically checked when the pipe union is disassembled.

23. A pipe union assembly including an integral fluid flow checking function as defined in claim 22 wherein the hollow rigid sealing means comprises means for attaching the hollow sealing means at a second end thereof to a second pipe member.

24. A pipe union assembly including an integral fluid flow checking function as defined in claim 22 further comprising:

a second hollow fitting member having means for attaching the second fitting member at a first end thereof to a second pipe member; and a truncated tapered ridge formed at the periphery of a second end of the second fitting member.

25. A pipe union assembly including an integral fluid flow checking function as defined in claim 24 wherein the hollow rigid sealing means further comprises:

a second tapered channel peripherally formed on a second end of the hollow rigid sealing means, the second tapered channel being configured to receive into sealing engagement the tapered ridge formed on the second hollow fitting member such that the truncated tapered ridge does not completely penetrate the second tapered channel; and wherein the pipe union assembly further comprises securing means for selectively applying pressure to the first and the second hollow fitting members so as to hold both of the truncated tapered ridges in sealing engagement with the first and second tapered channels, respectively.

26. A pipe union assembly including an integral fluid flow checking function as defined in claim 22 further comprising second check means for automatically halting the movement of fluid from the second pipe member through the second fitting member when the pipe union is disassembled.

27. A pipe union assembly including an integral fluid flow checking function as defined in claim 26 wherein the disabling means further comprises means for disabling the second check means.

28. A pipe union assembly including an integral fluid flow checking function as defined in claim 22 wherein the first check means comprises:

valve means for shutting and opening the hollow fitting members to fluid flow therethrough; and biasing means for maintaining the valve means in a normally closed position such that the valve means is shut when the pipe union is disassembled.

29. A pipe union assembly including an integral fluid flow checking function as defined in claim 28 wherein the valve means comprises a check ball disposed within the first fitting member; and a ball seat formed within the first fitting member.

30. A pipe union assembly including an integral fluid flow checking function as defined in claim 28 wherein the biasing means comprises a spring.

31. A pipe union assembly including an integral fluid flow checking function as defined in claim 22 wherein the disabling means comprises a rod disposed within the sealing means.

32. A pipe union assembly including an integral fluid flow checking function as defined in claim 22 wherein the disabling means comprises a rod held in axial alignment with the check ball such that the check ball is moved away from the ball seat when the pipe union is assembled.

33. A pipe union assembly including an integral fluid flow checking function as defined in claim 22 wherein the sealing means comprises a rod guide bore positioned axially within the sealing member.

34. A pipe union assembly including an integral fluid flow checking function as defined in claim 33 wherein the rod is removable.

35. A pipe union assembly including an integral fluid flow checking function as defined in claim 22 wherein the truncated tapered ridge comprises two opposing flat sides, each of said sides being oriented at an angle in the range from about 6° to about 8° with respect to a central axis of the first fitting member and wherein the tapered channel is defined by two flat tapered walls, said walls being oriented with respect to a central axis of the sealing means at an angle which is equal to the angle at which the tapered ridge sides are oriented with respect to the central axis of the fitting member.

36. A pipe union assembly including an integral fluid flow checking function as defined in claim 22 wherein the truncated tapered ridge has two opposing flat sides, each of said sides being oriented at an angle in the range from about 5° to about 9° with respect to a central axis of the first fitting member and wherein the tapered channel is defined by two flat tapered walls, said walls being oriented with respect to a central axis of the sealing means at an angle which is equal to the angle at which the tapered ridge sides are oriented with respect to the central axis of the fitting member.

37. A pipe union assembly including an integral fluid flow checking function as defined in claim 22 wherein the tapered ridge comprises two opposing flat sides, said ridge sides being fabricated from a material having a Brinell hardness value in the range from about 10 to about 150 Brinell units different than the Brinell hardness value of the material from which the tapered channel walls are fabricated, the Brinell units being measured on the Brinell hardness scale.

38. A pipe union assembly including an integral fluid flow checking function as defined in claim 22 wherein the securing means comprises an external sleeve, the external sleeve comprising a threaded interior portion and wherein the first fitting member comprises a threaded exterior portion adapted to engage the threaded interior portion.

39. A pipe union assembly including an integral fluid flow checking function as defined in claim 22 wherein the first and second fitting members, the sealing member, the securing means, and the disabling means are all comprised of materials capable of resisting elevated temperatures.

40. A pipe union assembly including an integral fluid flow checking function as defined in claim 22 further comprising restraining means for inhibiting the releasing of the securing means for such that the sealing engagement between the tapered ridge and the tapered channel is broken before the pipe union is completely disassembled.

41. A pipe union assembly including an integral fluid flow checking function as defined in claim 22 wherein the tapered ridge is configured so it cannot completely penetrate the tapered channel.

42. A pipe union assembly including an integral fluid flow checking function as defined in claim 22 wherein the sealing means is fabricated from a material having a coefficient of thermal expansion which is less than the coefficient of thermal expansion exhibited by the material from which the first fitting member is fabricated.

43. A pipe union assembly including an integral fluid flow checking function as defined in claim 22 wherein the sealing means is fabricated from a material having a coefficient of thermal expansion which is greater than the coefficient of thermal expansion exhibited by the material from which the first fitting member is fabricated.

44. A pipe union assembly including an integral fluid flow checking function as defined in claim 22 further comprising compensating means for compensating for thermal contraction of the rigid sealing means and the first fitting member so as to maintain the rigid sealing means in sealing engagement with the first fitting member at temperatures lower than the ambient assembly temperature.

* * * * *

UNITED STATES PATENT AND TRADEMARK OFFICE
CERTIFICATE OF CORRECTION

PATENT NO. : 5,355,908
DATED : October 18, 1994
INVENTOR(S) : MARTIN H. BERGER et al.

It is certified that error appears in the above-indentified patent and that said Letters Patent is hereby corrected as shown below:

Column 1, line 30, delete "are"
Column 5, line 4, "complimentary" should be --complementary--
Column 9, line 1, after "shown" insert --in--
Column 9, line 32, "angel A" should be --angle A--
Column 16, line 22, after "ferrule" insert --210--
Column 28, line 21, "principle structures" should be --principal structures--
Column 30, line 34, after "13" insert --)--
Column 31, line 50, "over tightening" should be --overtightening--
Column 33, line 21, "," should be --;--
Column 36, line 63, delete "for"

Signed and Sealed this

Fifteenth Day of August, 1995

Attest:

BRUCE LEHMAN

*Attesting Officer*   *Commissioner of Patents and Trademarks*